United States Patent
Rahman et al.

(10) Patent No.: US 9,860,810 B2
(45) Date of Patent: Jan. 2, 2018

(54) CELL CHANGE BASED ON UPLINK CONFIGURATION

(71) Applicant: Telefonaktiebolaget LM Ericsson (publ), Stockholm (SE)

(72) Inventors: Imadur Rahman, Sollentuna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/117,404

(22) PCT Filed: Feb. 11, 2015

(86) PCT No.: PCT/SE2015/050162
§ 371 (c)(1),
(2) Date: Aug. 8, 2016

(87) PCT Pub. No.: WO2015/122833
PCT Pub. Date: Aug. 20, 2015

(65) Prior Publication Data
US 2016/0353343 A1    Dec. 1, 2016

Related U.S. Application Data

(60) Provisional application No. 61/938,344, filed on Feb. 11, 2014.

(51) Int. Cl.
*H04W 36/00* (2009.01)
*H04W 36/08* (2009.01)
(Continued)

(52) U.S. Cl.
CPC ......... *H04W 36/08* (2013.01); *H04W 36/245* (2013.01); *H04W 36/30* (2013.01); *H04W 36/32* (2013.01)

(58) Field of Classification Search
CPC ... H04W 36/08; H04W 36/245; H04W 36/30; H04W 36/32
(Continued)

(56) References Cited

U.S. PATENT DOCUMENTS

| 5,487,174 A * | 1/1996 | Persson | H04W 36/30 |
| | | | 455/444 |
| 8,346,257 B2 * | 1/2013 | Kazmi | H04W 48/20 |
| | | | 455/428 |

(Continued)

FOREIGN PATENT DOCUMENTS

| CN | 102026260 A | 4/2011 |
| EP | 0586681 A1 | 3/1994 |

(Continued)

OTHER PUBLICATIONS

3GPP, "3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.2.0, Dec. 2013, 1-507.

(Continued)

*Primary Examiner* — Marceau Milord
(74) *Attorney, Agent, or Firm* — Murphy, Bilak & Homiller, PLLC

(57) ABSTRACT

The presently disclosed techniques and apparatus include techniques by which a cell change for a UE is based on the target cell's uplink transmission configuration, including, for example, the maximum number of allowed UL physical channel (e.g., UL resource blocks) for the target cell. An example method, such as might be performed in a network node, comprises determining (1010) an uplink transmission configuration related to uplink physical channels that can be transmitted by the wireless device on the second cell on the second frequency, and comparing (1020) a parameter of the (Continued)

determined uplink transmission configuration with a threshold or with a corresponding parameter of a determined uplink transmission configuration related to uplink physical channels that can be transmitted by the wireless device on the first cell on the first frequency. This example method further comprises performing (1030) a cell change to the second cell, based on the comparison.

36 Claims, 8 Drawing Sheets

(51) Int. Cl.
*H04W 36/30* (2009.01)
*H04W 36/24* (2009.01)
*H04W 36/32* (2009.01)

(58) Field of Classification Search
USPC .............................. 455/436, 437, 439, 442
See application file for complete search history.

(56) References Cited

U.S. PATENT DOCUMENTS

| | | | | |
|---|---|---|---|---|
| 8,649,790 | B2* | 2/2014 | Kazmi | H04W 36/24 370/331 |
| 8,909,229 | B2* | 12/2014 | Martin | H04W 36/0094 370/331 |
| 8,953,554 | B2* | 2/2015 | Kazmi | H04W 36/24 370/331 |
| 9,565,611 | B2* | 2/2017 | Callender | H04W 48/16 |
| 9,584,649 | B2* | 2/2017 | Lee | H04M 1/72563 |
| 2013/0242774 | A1* | 9/2013 | Wang | H04W 36/30 370/252 |
| 2013/0273920 | A1* | 10/2013 | Raghavendra | H04W 48/20 455/437 |
| 2015/0264603 | A1* | 9/2015 | Yang | H04W 36/24 455/436 |
| 2015/0282010 | A1* | 10/2015 | Yang | H04W 36/0016 455/437 |
| 2015/0304838 | A1* | 10/2015 | Kanamarlapudi | H04W 8/22 455/422.1 |
| 2016/0037406 | A1* | 2/2016 | Centonza | H04W 36/04 370/332 |

FOREIGN PATENT DOCUMENTS

| | | |
|---|---|---|
| WO | 9319537 A1 | 9/1993 |
| WO | 2011095687 A1 | 8/2011 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.7.0, Sep. 2013, 1-209.

Unknown, Author, "CoMP Related RAN2 Issues", 3GPP TSG-RAN WG2 Meeting #77, R2-120650, Huawei, HiSilicon, Dresden, Germany, Feb. 6-10, 2012, 1-4.

\* cited by examiner

CELL CHANGE BASED ON UPLINK CONFIGURATION

TECHNICAL FIELD

The present disclosure is generally related to wireless communications networks, and is more particularly related to selecting carriers for handover in a carrier aggregation scenario.

BACKGROUND

Carrier Aggregation

In the advanced wireless networks developed by members of the $3^{rd}$-Generation Partnership Project (3GPP), carrier aggregation is one of the recently introduced ways of increasing per-user throughput for users having good channel conditions and having the capability to receive and transmit at higher data rate. With carrier aggregation (CA), as applied to the fourth-generation 3GPP systems referred to as Long-Term Evolution (LTE) systems, for example, a user can be configured to transmit and/or receive data in two or three (or more) simultaneous bands in the downlink (DL) and/or in the uplink (UL).

FIG. 1 illustrates an example base station (an evolved Node B, or eNB, in the 3GPP terminology for LTE systems) that is capable of operating four different cells at the same time. These cells are operated in different bands, or they could also be operated in the same band. In networks compliant with only earlier versions of the 3GPP specifications, i.e., up to Release 8, only one cell is used for communication between the eNB and the wireless terminal (referred to as a user equipment, or UE, in 3GPP documentation). Note that the term "cell" as used here is closely related to the term "carrier," and refers to an independent set of radio channels operated in such a way that a UE can obtain service using only one cell. In a carrier aggregation scenario, compatible UEs may receive and transmit data on more than one carrier/cell, depending on how those UEs are configured by the network. The separate carriers in a carrier aggregation scenario are referred to as component carriers (CCs).

CA Cases Based on Different Number of CCs in DL and/or UL

2DL CA (CA with two DL CCs and one UL CC)
FIG. 2 illustrates a scenario in which two of the cells are activated for one UE, which is the initial version of DL carrier aggregation. In this case, the UE is configured to receive in two DL bands simultaneously, while using UL in only one of the bands. The specific UL allocation in this case is arbitrary, meaning that either of the bands can be used for UL transmission.

In carrier aggregation terms, the cell where the UL is allocated for a particular UE is the PCell (primary cell) for that UE, while the other aggregated cell is an SCell (secondary cell). PCell and SCell combinations are UE-specific, in that the network can configure different UEs to have different allocations of PCell and SCells while using the same carriers.

3DL CA (CA with three DL CCs and one or two UL CCs)
FIG. 3 illustrates a scenario in which three DL carriers, falling in two different frequency bands, are allocated to a UE. As in the 2DL case, the UL can be allocated to any of the bands. Because the carriers are in different frequency bands, this configuration is referred to as inter-band carrier aggregation, similar to 2DL inter-band carrier aggregation.

2UL CA (CA with two UL CCs and two or three DL CCs)
Unlike the two previous cases, FIG. 4 illustrates a scenario in which UL carrier aggregation is also enabled for the terminal. In this case, only two UL and two DL carrier aggregation is shown. In case of UL carrier aggregation, PCell and SCell definitions are still UE-specific. 2UL carrier aggregation can be combined with carrier aggregation of more than two DL carriers. In essence, there are no restrictions between different UL and DL carrier aggregation to be used simultaneously.

Carrier Aggregation Deployment Scenarios

Depending on the carrier frequency(ies), or depending on the physical eNB deployment, the deployment of CA-enabled systems can be very different.

FIG. 5 illustrates two examples of CA deployment. The left-hand figure shows that two cells designated "f1" and "f2" are co-located and overlaid, but f2 has smaller coverage due to larger path loss. (In the figure, the regions of f2 coverage are shaded, while the larger f1 coverage regions are not.) "f1" and "f2" indicate that the cells are operated on different frequencies, which may or may not be in the same frequency band. The differences in coverage seen in FIG. 5 may be the case, for example, where f2 and f1 are operated on widely separated frequency bands.

In the scenario shown in FIG. 5, only f1 provides comprehensive coverage for the entire region, while f2 is used to improve throughput for those UEs that are adequately covered. Mobility in this scenario is necessarily performed based on f1 coverage. A scenario like that illustrated in FIG. 5 is likely when f1 and f2 are of different bands, e.g., f1={800 MHz, 2 GHz} and f2={3.5 GHz}, etc. In this scenario, it is expected that aggregation is possible between overlaid f1 and f2 cells.

The figure on the right-hand side of FIG. 5 shows a different kind of deployment. In this case, f1 cells provide macro coverage, while f2 Remote Radio Heads (RRHs) are used to improve throughput at hot spots. Again, mobility is performed based on f1 coverage. A likely scenario is that f1 and f2 are of different bands, e.g., f1={800 MHz, 2 GHz} and f2={3.5 GHz}, etc. It is expected that f2 RRHs cells can be aggregated with the underlying f1 macro cells.

UL Configurations

In LTE, the nominal number of resource blocks (RBs, the basic time-frequency radio resource in LTE) is 6, 15, 25, 50, 75 and 100 RBs for channel bandwidths of 1.4 MHz, 3 MHz, 5 MHz, 10 MHz, 15 MHz and 20 MHz, respectively. This is shown in table 1, below. However the actual maximum limit for any given UL configuration in practice, in terms of allowed RBs, is pre-defined in the standard for different bands and CA configurations. These limits are designed to ensure that the UE meets one or more pre-defined receiver requirements, such as a requirement for UE receiver sensitivity referred to in LTE specifications as REFSENS. The limits on UL configuration also depend upon the channel bandwidth.

More specifically, the UL configurations specified by the standards for different band and different CA configurations determine the maximum UL transmission block size, in terms of RBs, when a particular CA configuration is used or when a single UL carrier is used. Three representative tables 2, 3 and 4 from the 3GPP specification, "Evolved Universal Terrestrial Radio Access (E-UTRA); User Equipment (UE) radio transmission and reception," 3GPP TS36.101, v. 12.2.0 (January 2014), available at http://www.3gpp.org, are presented below, and show allowed UL configurations when single UL transmission, or inter-band CA, or intra-band non-contiguous CA, respectively, are used. It can be observed from tables 1-4 that for certain bands, CA, and bandwidth (BW) combinations in CA, the UL configuration (i.e., the maximum number of allowed UL RBs) is severely reduced compared to the corresponding nominal values (i.e., in table 1).

TABLE 1

Transmission bandwidth configuration $N_{RB}$ in E-UTRA channel bandwidths for both UL and DL

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

TABLE 2

Uplink configuration for reference sensitivity
E-UTRA Band/Channel bandwidth/$N_{RB}$/Duplex mode

| E-UTRA Band | 1.4 MHz | 3 MHz | 5 MHz | 10 MHz | 15 MHz | 20 MHz | Duplex Mode |
|---|---|---|---|---|---|---|---|
| 1 | | | 25 | 50 | 75 | 100 | FDD |
| 2 | 6 | 15 | 25 | 50 | 50[1] | 50[1] | FDD |
| 3 | 6 | 15 | 25 | 50 | 50[1] | 50[1] | FDD |
| 4 | 6 | 15 | 25 | 50 | 75 | 100 | FDD |
| 5 | 6 | 15 | 25 | 25[1] | | | FDD |
| 6 | | | 25 | 25[1] | | | FDD |
| 7 | | | 25 | 50 | 75 | 75[1] | FDD |
| 8 | 6 | 15 | 25 | 25[1] | | | FDD |
| 9 | | | 25 | 50 | 50[1] | 50[1] | FDD |
| 10 | | | 25 | 50 | 75 | 100 | FDD |
| 11 | | | 25 | 25[1] | | | FDD |
| 12 | 6 | 15 | 20[1] | 20[1] | | | FDD |
| 13 | | | 20[1] | 20[1] | | | FDD |
| 14 | | | 15[1] | 15[1] | | | FDD |
| ... | | | | | | | |
| 17 | | | 20[1] | 20[1] | | | FDD |
| 18 | | | 25 | 25[1] | 25[1] | | FDD |
| 19 | | | 25 | 25[1] | 25[1] | | FDD |
| 20 | | | 25 | 20[1] | 20[3] | 20[3] | FDD |
| 21 | | | 25 | 25[1] | 25[1] | | FDD |
| 22 | | | 25 | 50 | 50[1] | 50[1] | FDD |
| 23 | 6 | 15 | 25 | 50 | 75 | 100 | FDD |
| 24 | | | 25 | 50 | | | FDD |
| 25 | 6 | 15 | 25 | 50 | 50[1] | 50[1] | FDD |
| 26 | 6 | 15 | 25 | 25[1] | 25[1] | | FDD |
| 27 | 6 | 15 | 25 | 25[1] | | | FDD |
| 28 | | 15 | 25 | 25[1] | 25[1] | 25[1] | FDD |
| 30 | | | 25 | 25[1] | | | FDD |
| 31 | 6 | 5[4] | 5[4] | | | | FDD |
| ... | | | | | | | |
| 33 | | | 25 | 50 | 75 | 100 | TDD |
| 34 | | | 25 | 50 | 75 | | TDD |
| 35 | 6 | 15 | 25 | 50 | 75 | 100 | TDD |
| 36 | 6 | 15 | 25 | 50 | 75 | 100 | TDD |
| 37 | | | 25 | 50 | 75 | 100 | TDD |
| 38 | | | 25 | 50 | 75 | 100 | TDD |
| 39 | | | 25 | 50 | 75 | 100 | TDD |
| 40 | | | 25 | 50 | 75 | 100 | TDD |
| 41 | | | 25 | 50 | 75 | 100 | TDD |
| 42 | | | 25 | 50 | 75 | 100 | TDD |
| 43 | | | 25 | 50 | 75 | 100 | TDD |
| 44 | | 15 | 25 | 50 | 75 | 100 | TDD |

NOTE 1:
[1]refers to the UL resource blocks shall be located as close as possible to the downlink operating band but confined within the transmission bandwidth configuration for the channel bandwidth (Table 5.6-1).
NOTE 2:
For the UE which supports both Band 11 and Band 21 the uplink configuration for reference sensitivity is FFS.
NOTE 3:
[3]refers to Band 20; in the case of 15 MHz channel bandwidth, the UL resource blocks shall be located at $RB_{start}$ 11 and in the case of 20 MHz channel bandwidth, the UL resource blocks shall be located at $RB_{start}$ 16
NOTE 4:
[4]refers to Band 31; in the case of 3 MHz channel bandwidth, the UL resource blocks shall be located at $RB_{start}$ 9 and in the case of 5 MHz channel bandwidth, the UL resource blocks shall be located at $RB_{start}$ 10.

TABLE 3

Uplink configuration for reference sensitivity
E-UTRA Band/Channel bandwidth/NRB/Duplex mode

| EUTRA CA Configuration | EUTRA band | 1.4 MHz (dBm) | 3 MHz (dBm) | 5 MHz (dBm) | 10 MHz (dBm) | 15 MHz (dBm) | 20 MHz (dBm) | Duplex mode |
|---|---|---|---|---|---|---|---|---|
| CA_2A-29A | 2 | | | 25 | 50 | | | FDD |
| | 29 | | N/A | N/A | N/A | | | |
| CA_4A-29A | 4 | | | 25 | 50 | | | FDD |
| | 29 | | N/A | N/A | N/A | | | |
| CA_23A-29A | 23 | | | 25 | 50 | 75 | 100 | FDD |
| | 29 | | N/A | N/A | N/A | | | |

TABLE 4

Intra-band non-contiguous CA uplink configuration for reference sensitivity

| CA configuration | Aggregated channel bandwidth (PCC + SCC) | $W_{gap}$/[MHz] | UL PCC allocation | $\Delta R_{IBNC}$ (dB) | Duplex mode |
|---|---|---|---|---|---|
| CA_3A-3A | 25RB + 25RB | $45.0 < W_{gap} \leq 65.0$ | 12[1] | 4.7 | FDD |
| | | $0.0 < W_{gap} \leq 45.0$ | 25[1] | 0 | |
| | 25RB + 50RB | $40.0 < W_{gap} \leq 60.0$ | 12[1] | 3.8 | |
| | | $0.0 < W_{gap} \leq 40.0$ | 25[1] | 0 | |
| | 25RB + 75RB | $35.0 < W_{gap} \leq 55.0$ | 12[1] | 3.6 | |
| | | $0.0 < W_{gap} \leq 35.0$ | 25[1] | 0 | |

TABLE 4-continued

Intra-band non-contiguous CA uplink configuration for reference sensitivity

| CA configuration | Aggregated channel bandwidth (PCC + SCC) | $W_{gap}$/[MHz] | UL PCC allocation | $\Delta R_{IBNC}$ (dB) | Duplex mode |
|---|---|---|---|---|---|
| | 25RB + 100RB | $30.0 < W_{gap} \leq 50.0$ | $12^1$ | 3.4 | |
| | | $0.0 < W_{gap} \leq 30.0$ | $25^1$ | 0 | |
| | 50RB + 25RB | $30.0 < W_{gap} \leq 60.0$ | $12^9$ | 5.1 | |
| | | $0.0 < W_{gap} \leq 30.0$ | $32^1$ | 0 | |
| | 50RB + 50RB | $25.0 < W_{gap} \leq 55.0$ | $12^9$ | 4.3 | |
| | | $0.0 < W_{gap} \leq 25.0$ | $32^1$ | 0 | |
| | 50RB + 75RB | $20.0 < W_{gap} \leq 50.0$ | $12^9$ | 3.8 | |
| | | $0.0 < W_{gap} \leq 20.0$ | $32^1$ | 0 | |
| | 50RB + 100RB | $15.0 < W_{gap} \leq 45.0$ | $12^9$ | 3.4 | |
| | | $0.0 < W_{gap} \leq 15.0$ | $32^1$ | 0 | |
| | 75RB + 25RB | $25.0 < W_{gap} \leq 55.0$ | $12^{10}$ | 6.0 | |
| | | $0.0 < W_{gap} \leq 25.0$ | $32^1$ | 0 | |
| | 75RB + 50RB | $20.0 < W_{gap} \leq 50.0$ | $12^{10}$ | 4.7 | |
| | | $0.0 < W_{gap} \leq 20.0$ | $32^1$ | 0 | |
| | 75RB + 75RB | $15.0 < W_{gap} \leq 45.0$ | $12^{10}$ | 4.2 | |
| | | $0.0 < W_{gap} \leq 15.0$ | $32^1$ | 0 | |
| | 75RB + 100RB | $10.0 < W_{gap} \leq 40.0$ | $12^{10}$ | 3.8 | |
| | | $0.0 < W_{gap} \leq 10.0$ | $32^1$ | 0 | |
| | 100RB + 25RB | $15.0 < W_{gap} \leq 50.0$ | $16^{11}$ | 6.5 | |
| | | $0.0 < W_{gap} \leq 15.0$ | $32^1$ | 0 | |
| | 100RB + 50RB | $10.0 < W_{gap} \leq 45.0$ | $16^{11}$ | 5.1 | |
| | | $0.0 < W_{gap} \leq 10.0$ | $32^1$ | 0 | |
| | 100RB + 75RB | $5.0 < W_{gap} \leq 40.0$ | $16^{11}$ | 4.5 | |
| | | $0.0 < W_{gap} \leq 5.0$ | $32^1$ | 0 | |
| | 100RB + 100RB | $0.0 < W_{gap} \leq 35.0$ | $16^{11}$ | 4.1 | |
| CA_4A-4A | NOTE 6 | NOTE 7 | NOTE 8 | 0.0 | FDD |
| CA_7A_7A | 50RB + 50RB | $25.0 < W_{gap} \leq 50.0$ | $32^1$ | 0.0 | FDD |
| | | $0.0 < W_{gap} \leq 25.0$ | $50^1$ | 0.0 | |
| | 75RB + 25RB | $20.0 < W_{gap} \leq 50.0$ | $32^1$ | 0.0 | |
| | | $0.0 < W_{gap} \leq 20.0$ | $50^1$ | 0.0 | |
| | 75RB + 50RB | $20.0 < W_{gap} \leq 45.0$ | $32^1$ | 0.0 | |
| | | $0.0 < W_{gap} \leq 20.0$ | $50^1$ | 0.0 | |
| | 75RB + 75RB | $15.0 < W_{gap} \leq 40.0$ | $32^1$ | 0.0 | |
| | | $0.0 < W_{gap} \leq 15.0$ | $50^1$ | 0.0 | |
| | 100RB + 75RB | $15.0 < W_{gap} \leq 35.0$ | $36^1$ | 0.0 | |
| | | $0.0 < W_{gap} \leq 15.0$ | $50^1$ | 0.0 | |
| | 100RB + 100RB | $15.0 < W_{gap} \leq 30.0$ | $32^1$ | 0.0 | |
| | | $0.0 < W_{gap} \leq 15.0$ | $45^1$ | 0.0 | |
| CA_23A-23A | NOTE 6 | NOTE 7 | NOTE 8 | 0.0 | FDD |
| CA_25A-25A | 25RB + 25RB | $30.0 < W_{gap} \leq 55.0$ | $10^1$ | 5.0 | FDD |
| | | $0.0 < W_{gap} \leq 30.0$ | $25^1$ | 0.0 | |
| | 25RB + 50RB | $25.0 < W_{gap} \leq 50.0$ | $10^1$ | 4.5 | |
| | | $0.0 < W_{gap} \leq 25.0$ | $25^1$ | 0.0 | |
| | 50RB + 25RB | $15.0 < W_{gap} \leq 50.0$ | $10^4$ | 5.5 | |
| | | $0.0 < W_{gap} \leq 15.0$ | $32^1$ | 0.0 | |
| | 50RB + 50RB | $10.0 < W_{gap} \leq 45.0$ | $10^4$ | 5.0 | |
| | | $0.0 < W_{gap} \leq 10.0$ | $32^1$ | 0.0 | |
| CA_41A-41A | NOTE 6 | NOTE 7 | NOTE 8 | 0.0 | TDD |

NOTE 1: $^1$refers to the UL resource blocks shall be located as close as possible to the downlink operating band but confined within the transmission.
NOTE 2: $W_{gap}$ is the sub-block gap between the two sub-blocks.
NOTE 3: The carrier center frequency of PCC in the UL operating band is configured closer to the DL operating band.
NOTE 4: $^4$refers to the UL resource blocks shall be located at $RB_{start} = 33$.
NOTE 5: For the TDD intra-band non-contiguous CA configurations, the minimum requirements apply only in synchronized operation between all component carriers.
NOTE 6: All combinations of channel bandwidths defined in Table 5.6A.1-3.
NOTE 7: All applicable sub-block gap sizes.
NOTE 8: The PCC allocation is same as Transmission bandwidth configuration $N_{RB}$ as defined in Table 5.6-1.
NOTE 9: $^9$refers to the UL resource blocks shall be located at $RB_{start} = 25$.
NOTE 10: $^{10}$refers to the UL resource blocks shall be located at $RB_{start} = 35$.
NOTE 11: $^{11}$refers to the UL resource blocks shall be located at $RB_{start} = 50$.

Maximum Power Reduction

Maximum output power (MPR) is defined as an allowed reduction to a UE's maximum output power due to higher order modulation and transmit bandwidth configuration. A general MPR formula is defined in 3GPP specifications for UE operation for different transmission modes, e.g., single UL transmission, 2UL CA transmission, etc. The UE applies the MPR based on UL transmission parameters, e.g., modulation, UL configuration, CA type or configuration, etc.

An Additional Maximum Power Reduction (A-MPR) is defined for certain bands; the A-MPR is allowed to be applied on top of MPR for certain bands. A-MPR is usually defined for specific coexistence requirements, etc. The A-MPR is signaled to the UE by the network node.

Both MPR and A-MPR are used by the UE to comply with one or more radio emission requirements, e.g., out of band emission, spurious emission or additional spurious emission requirements.

Unwanted Emissions

In an ideal case, the transmitter radio is not supposed to transmit anything outside its transmission spectrum. However, due to limitations of practical radio systems, there will be unwanted signals outside the allowed spectrum. The power spectral density (PSD), i.e., the signal power per unit bandwidth, for a UE's transmission depends on transmission power, transmission bandwidth, location of the UL RBs allocated to the UE, etc. The unwanted emissions depend on many issues, e.g., bandwidth of the signal, the transmission power, etc. For larger transmission bandwidth, the unwanted spectrum is also larger compared to smaller transmission bandwidth, when PSD/RB is the same for both cases. Usually for fixed transmission power, with larger transmission bandwidth, the PSD will be smaller, thus the strength of unwanted signals will be smaller for larger transmission bandwidth compared to small transmission bandwidth for fixed transmission power. However, the spread in frequency will also be larger.

The 3GPP specifications for UE operation outline two separate kinds of unwanted emissions, namely (1) Out-Of-Band (OOB) emissions and (2) spurious emissions, both of which are outside the intended channel bandwidth. A schematic diagram illustrating limits for these unwanted emissions is shown in FIG. 6.

Out-of-band emissions are those which fall in a band close to the intended transmission, while spurious emissions can be at any other frequency. The precise boundary between the OOB range and the spurious range is different for different aspects of the LTE specifications.

LTE defines requirements for both types of unwanted emission, with those for spurious emissions being the more stringent. Since different bands have different maximum allowed transmission bandwidths and also different bands have different coexistence requirements, the spurious emission requirements are appended by additional spurious emission requirements in certain bands.

Inter-Modulation Distortion

Inter-modulation distortion (IMD) happens when two or more tones, i.e., distinct signals or carriers, are present in a non-linear device, such as an amplifier in a receiver. In this case, intermodulation products are created. In a single UL transmission, intermodulation (IM) products may happen due to the actual RB allocation and its image being intermodulated in the receiver. Odd-ordered products are typically of most concern, as these are most likely to fall in or near a band of interest. The strength of an IMD product depends on its order; thus, $3^{rd}$-order and $5^{th}$-order IMD most often cause receiver degradation. However, r-order IMD can also be detrimental to receiver performance.

In FIG. 7, an example for CA with a 20 MHz primary component carrier (PCC) and a 5 MHz secondary component carrier (SCC) is illustrated. Here, when only one UL is used at 20 MHz (shown at the right hand side of the UL band), then the distance in frequency for IM3, IM5 and IM7 falls as shown in the figure.

Whether IMD falls in a receiver band of the receiver or not depends on the duplex gap, the position of UL and/or DL transmission signals, etc. Depending on IMD in the receive band, several different additional mitigations may be required. For example, inter-band CA between band 4 and band 12 causes harmonics and IMD from B12 to B4, thus, the use of Band 12 with Band 4 requires that additional components to remove the harmonics in the Band 12 receiver. These additional components mean that the Band 12 receiver has a loss that is about 0.5 dB higher than other generic cases.

SUMMARY

Embodiments of the presently disclosed techniques and apparatus include techniques by which a cell change for a UE is based on the target cell's UL configuration, including, for example, the maximum allowed UL physical channel (e.g., UL resource blocks) for the target cell. The change may also be based on one or more other characteristics for the UL carrier or carriers, such as A-MPR, additional spectrum emission requirements, etc. These techniques may be used to ensure that the UL performance of the UE after cell change is within acceptable limit.

In an example method according to the techniques disclosed herein, steps performed in a first node or second node performing cell change of a second node (e.g., wireless device) include: determining an UL transmission configuration (e.g., a maximum number of allowed UL physical channels, such as RBs) for at least the current serving cell; comparing the obtained UL configuration with the UL configuration of one or more target cells; and performing cell change of the second node based on the comparison.

The first node may perform the cell change to the target cell with the largest UL configuration, and it may take into account one or more additional criteria (e.g., DL signal quality, etc.) for selecting the target cell.

Another example method, such as might be performed in a network node, comprises determining an uplink transmission configuration related to uplink physical channels that can be transmitted by the wireless device on the second cell on the second frequency, and comparing a parameter of the determined uplink transmission configuration with a threshold or with a corresponding parameter of a determined uplink transmission configuration related to uplink physical channels that can be transmitted by the wireless device on the first cell on the first frequency. This example method further comprises performing a cell change to the second cell, based on the comparison.

In some embodiments, the uplink transmission configurations for the first and second cells include maximum uplink transmission block sizes for the wireless device on the first and second cells, respectively, and/or maximum numbers of uplink resource blocks for the wireless device on the first and second cells, respectively.

In some embodiments, the cell change to the second cell is performed in response to the comparison meeting at least one of the following conditions: a number of uplink physical channels that can be transmitted by the wireless device on the second cell is above the threshold; a ratio of a number of uplink physical channels that can be transmitted by the wireless device on the second cell and a total number of uplink physical channels over the transmission bandwidth of the second cell is above the threshold; a difference, in the frequency domain, between the locations of at least one uplink physical channel that can be transmitted by the wireless device in the second cell and a last or first uplink physical channel in the second cell is above the threshold; a maximum power reduction for the wireless device in the second cell is below the threshold; a spurious emission requirement level for the wireless device in the second cell is below the threshold; and an additional maximum power reduction (A-MPR) for the wireless device in the second cell is below the threshold.

Similar methods can be carried out by a wireless device, such as a UE. An example method that might carried out in a wireless device likewise comprises determining an uplink transmission configuration related to uplink physical channels that can be transmitted by the wireless device on the second cell on the second frequency, and comparing a parameter of the determined uplink transmission configuration with a threshold or with a corresponding parameter of a determined uplink transmission configuration related to uplink physical channels that can be transmitted by the wireless device on the first cell on the first frequency. This example method further comprises performing a cell change to the second cell, based on the comparison.

Network node apparatuses and wireless device apparatuses configured to carry out one or more of the above-summarized methods are also described in detail below.

The techniques disclosed herein may provide a number of advantages, in various embodiments. For example, a cell change based on UL configuration (i.e., UL physical resources) ensures that after the cell change the UL data rate or throughput is maintained or enhanced. The techniques may also enhances DL data rate or throughput, since higher data rate in DL also proportionally requires higher UL data rate; the latter is not bottleneck thanks to new cell change procedure. The techniques further enable the network node to use the most appropriate type of CA and/or CA configuration in terms of UL configuration in case higher data rate is needed in the UL. The techniques also enable the network node or wireless device (which ever performing cell change) to use also additional criteria like DL signal quality to ensure that the coverage of the wireless is still maintained while the UL data rate is enhanced.

Several detailed embodiments are described in the discussion that follows.

Figure illustrates carrier aggregation in both uplink and downlink.

Figure 1:
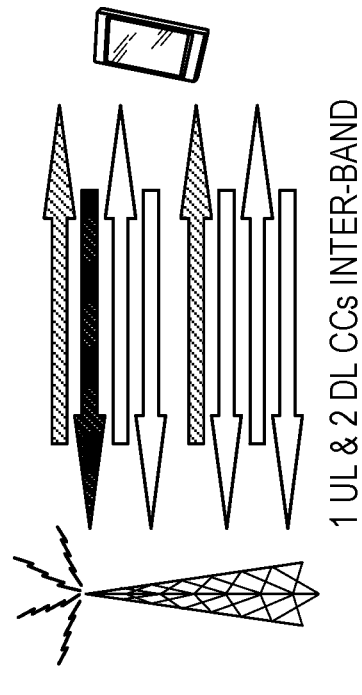
FIG. 1 illustrates single-uplink and single-downlink transmission between a base station (eNB) and a wireless device (UE).
Figure 2:
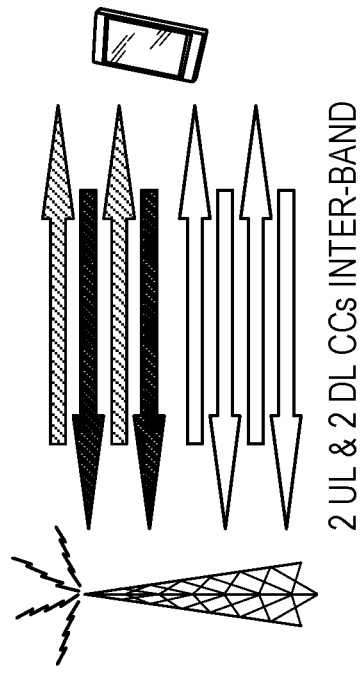
FIG. 2 illustrates downlink carrier aggregation, with single-uplink transmission.
Figure 3:
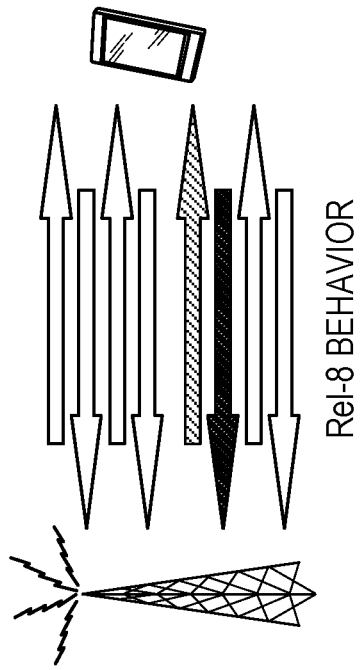
FIG. 3 illustrates downlink carrier aggregation across three downlink bands.
Figure 4:
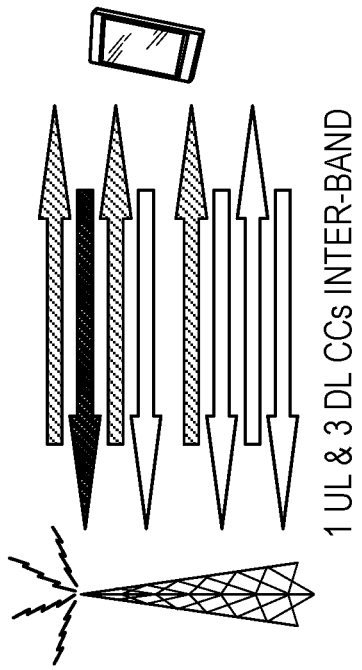
Figure 5:
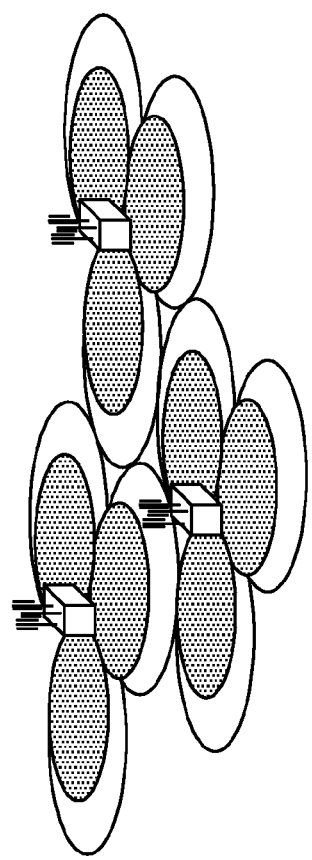
Figure 5:
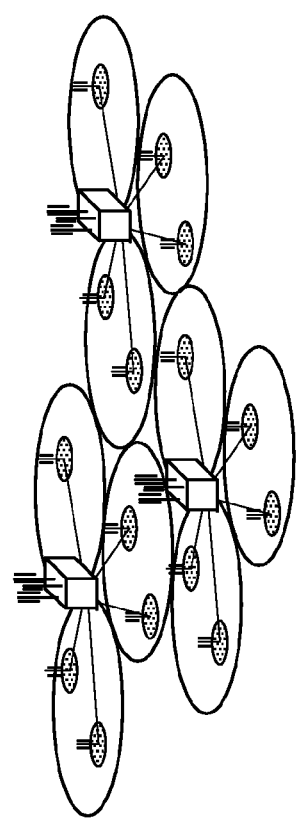

FIG. 5 illustrates two examples of carrier deployment scenarios.

Figure 6:
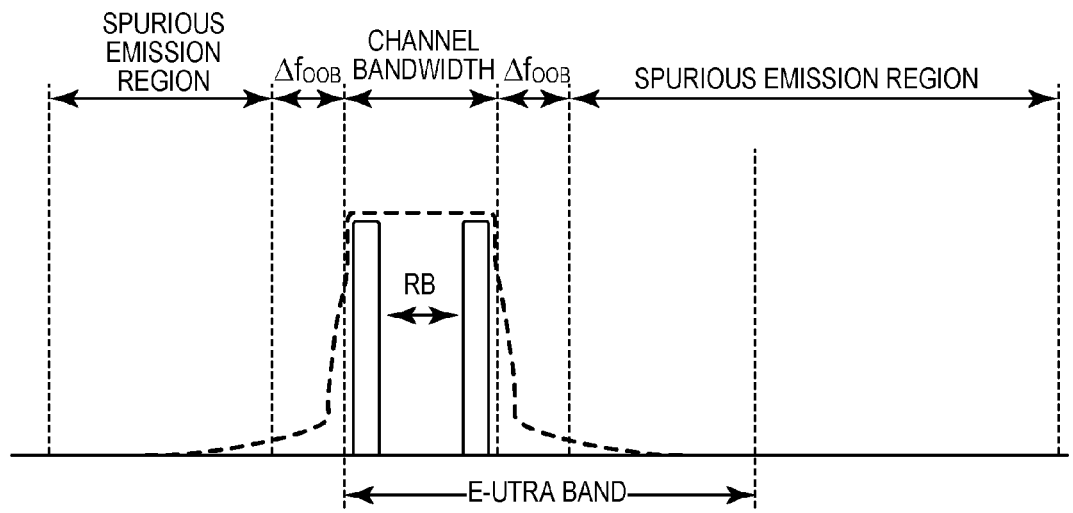

FIG. 6 is a schematic description of unwanted emissions.

Figure 7:
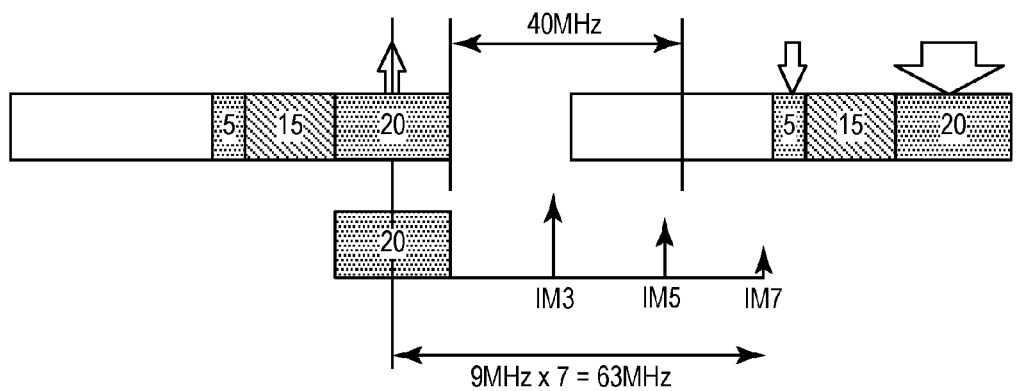

FIG. 7 is a graphical illustration of higher order intermodulation distortion for carrier aggregation in Band 2.

Figure 8:
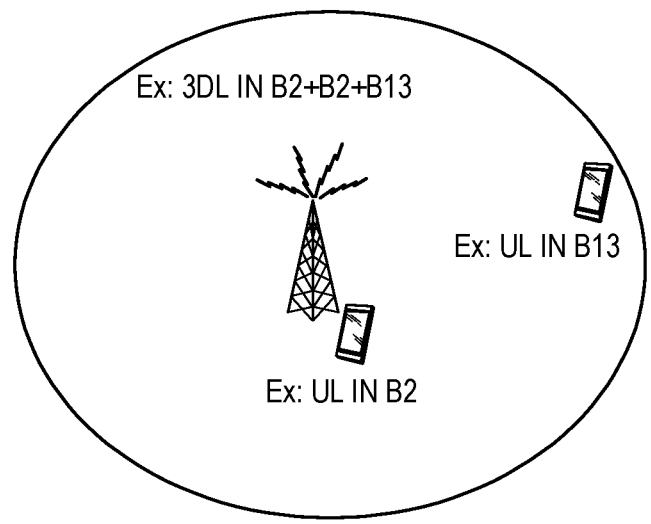

FIG. 8 illustrates an example of 3-carrier downlink carrier aggregation, where the uplink cell is allocated based on the resulting uplink transmission configuration.

Figure 9:
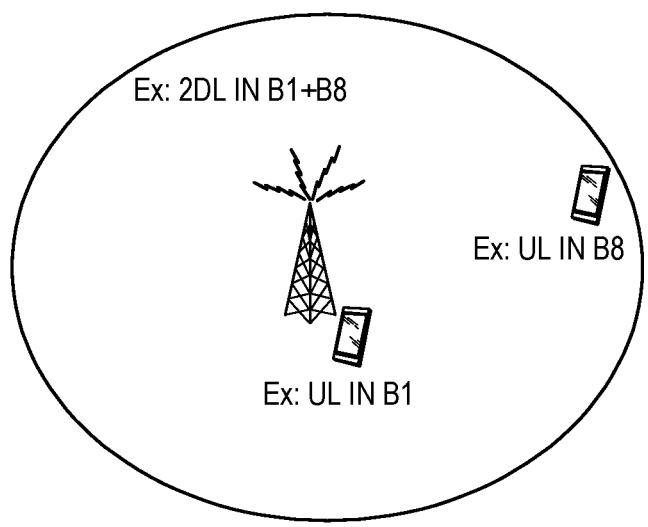

FIG. 9 illustrates a two-carrier downlink carrier aggregation example, where a cell change is based on the user location.

Figure 10:
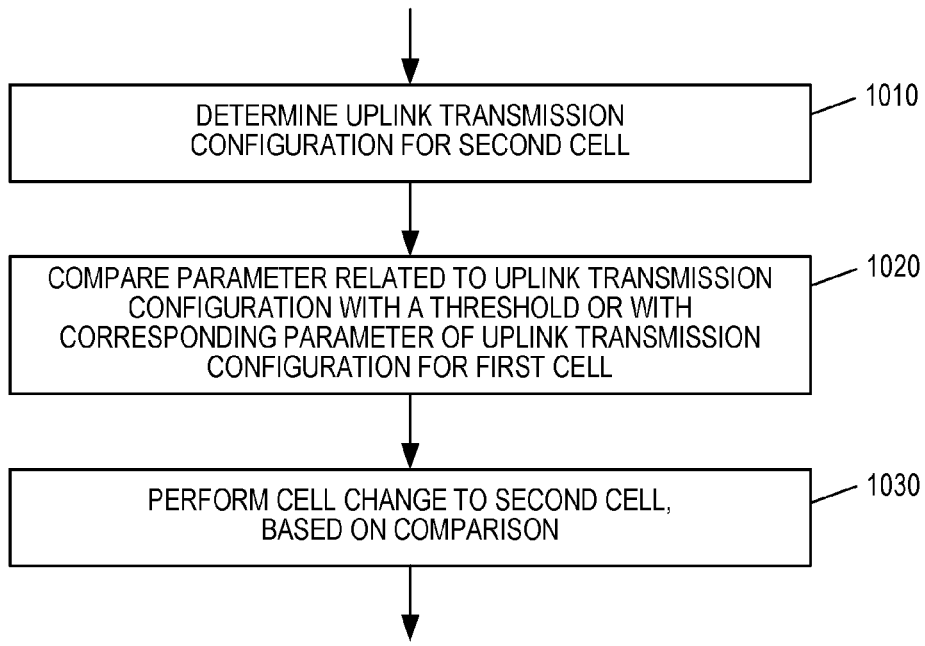

FIG. 10 is a process flow diagram illustrating an example method carried out in a network node of a wireless network.

Figure 11:
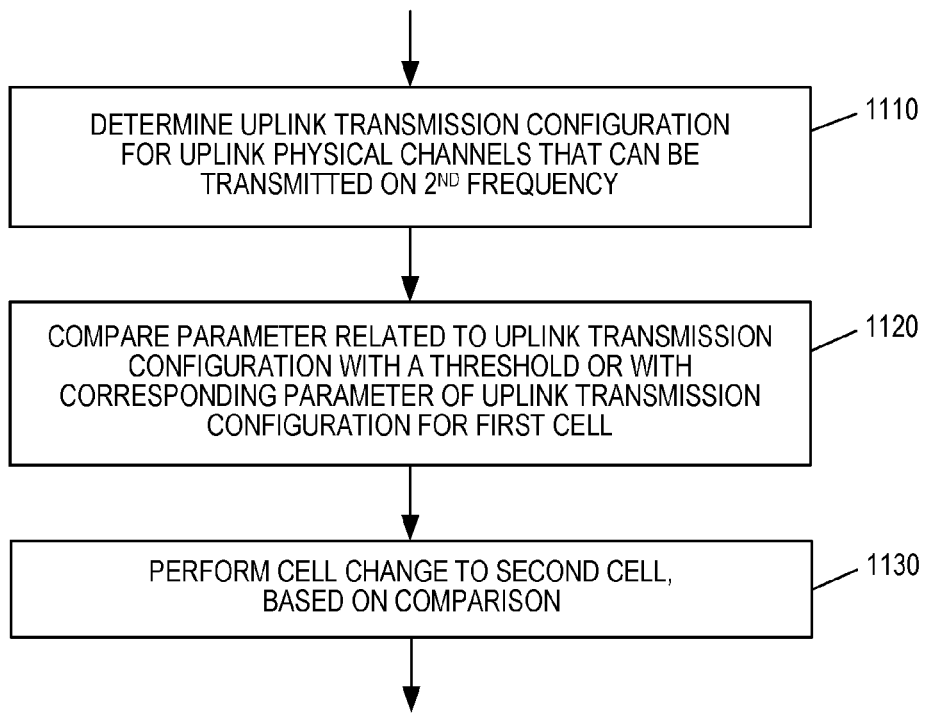

FIG. 11 is a process flow diagram illustrating an example method carried out in a wireless device.

Figure 12:
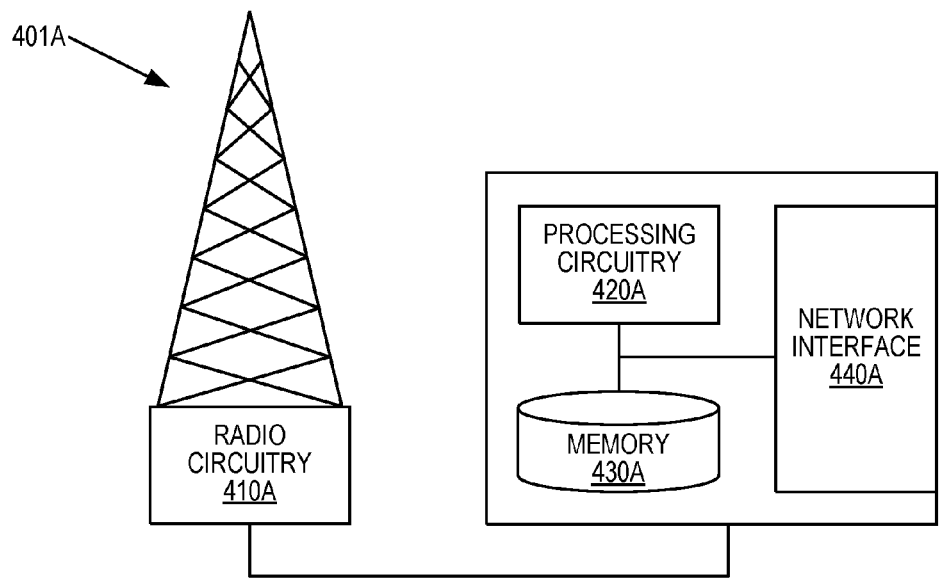

FIG. 12 is a block diagram illustrating components of an example base station.

Figure 13:
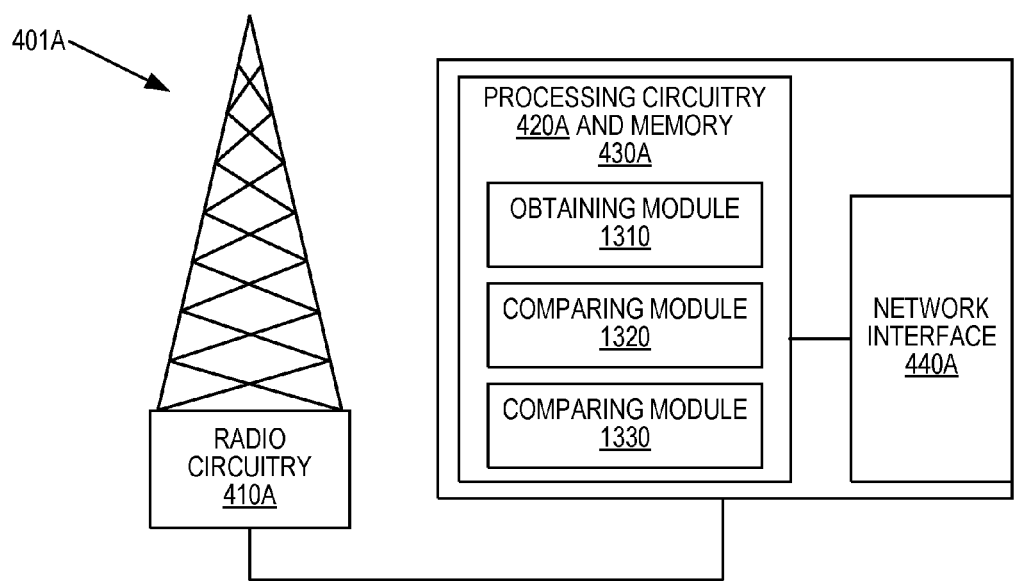

FIG. 13 is a block diagram illustrating another representation of the base station of FIG. 12.

Figure 14:
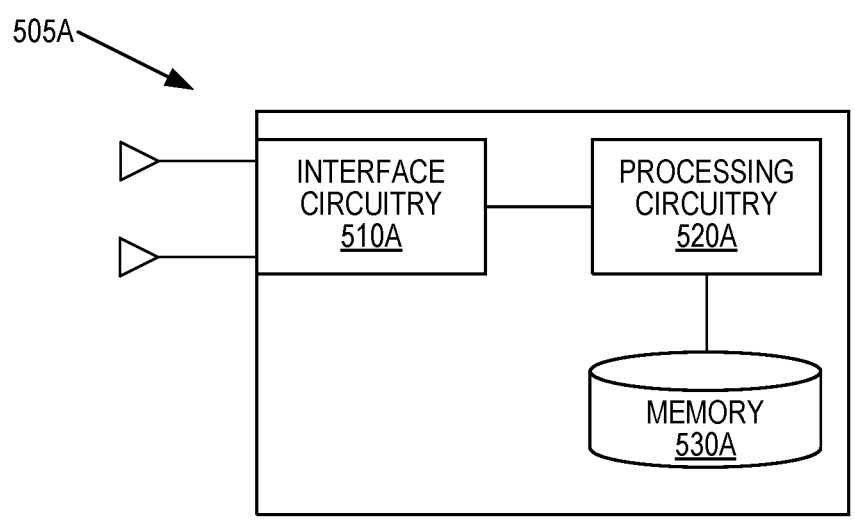

FIG. 14 is a block diagram illustrating components of another example network node.

Figure 15:
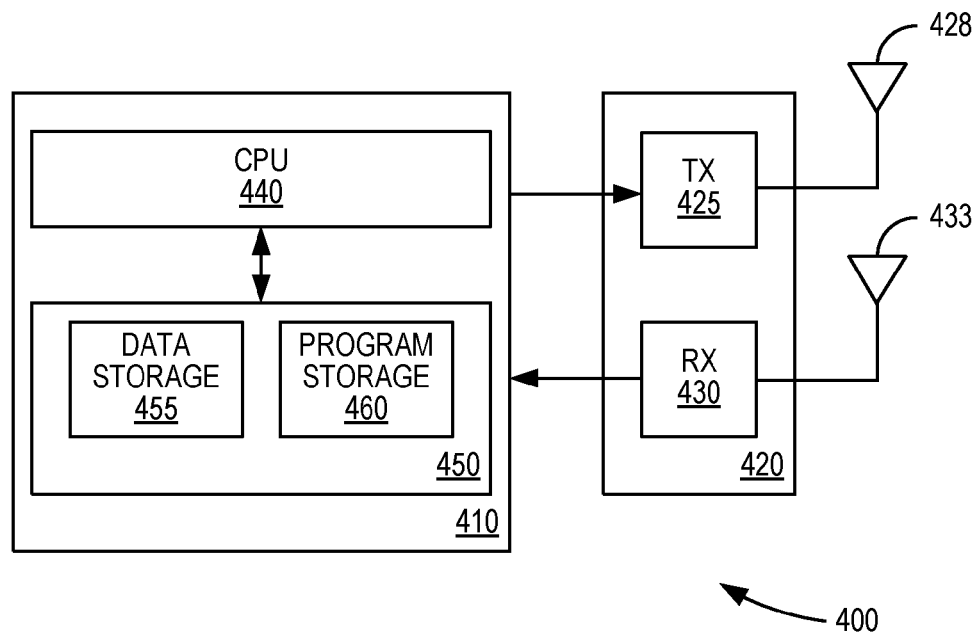

FIG. 15 is a block diagram illustrating components of an example wireless device.

Figure 16:
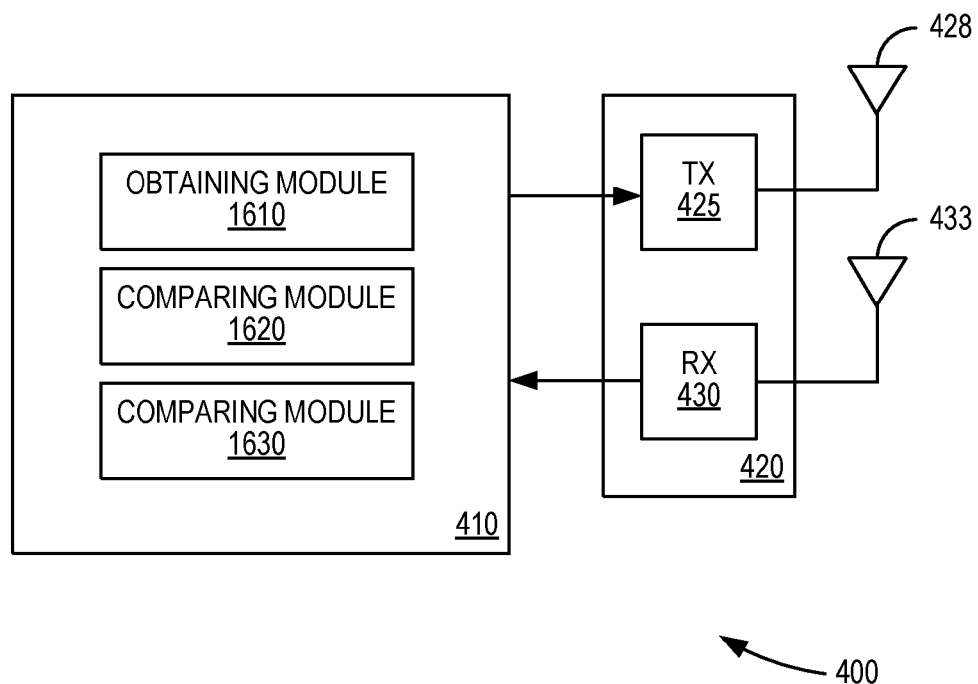

FIG. 16 is a block diagram illustrating another representation of the base station of FIG. 15.

DETAILED DESCRIPTION

In the description of some embodiments, below, the non-limiting term UE is used. In other instances, the terms "communication device," "wireless device," "mobile terminal," or "mobile station" may be used. For purposes of understanding the presently disclosed techniques and apparatus, these terms may be considered to be interchangeable. A UE or communication device described herein can be any type of wireless device capable of communicating with a network node or with another communication device over radio signals. Such a device may also be referred to as a radio communication device or a target device, and such devices may also include any of those devices known as a device-to-device (D2D) UE, a machine-type UE or UE capable of machine-to-machine communication (M2M), a sensor equipped with a UE, iPAD, a wireless-enabled tablet computing device, a mobile terminal, a smart phone, a laptop embedded equipped (LEE), a laptop-mounted equipment (LME), a USB dongle, a Customer Premises Equipment (CPE), etc.

Further, in describing some embodiments, the generic terminology "radio network node" or simply "network node (NW node)", may be used. These terms may be used to refer to any kind of network node in a radio access network (RAN), such as a base station, radio base station, base transceiver station, base station controller, network controller, evolved Node B (eNB), Node B, relay node, access point, radio access point, Remote Radio Unit (RRU) Remote Radio Head (RRH), etc. In the description of some embodiments, the generic terms "cell change" or "cell change of UE" or "cell change of second node" may be used. Examples of cell changes are handovers, Radio Resource Control (RRC) connection re-establishments, RRC connection releases with redirection, PCell changes in CA, PCC changes in CA, SCell changes in CA, SCC changes in CA, swapping between PCC and SCC, etc. In idle or low activity, RRC-state examples of a cell change are cell selection, cell reselection, etc. These latter cell changes are autonomously performed by the UE.

In describing some embodiments, the term "determining" is used. The term "determining," e.g., as related to "determining" a particular item of information or a parameter, refers to an operation that may include calculating, obtaining (e.g., from another node), receiving (e.g., from another node), detecting (e.g., from a received signal), identifying (e.g., from a collection of data), etc., the information or parameter.

Several of the embodiments below are described in the context of the Long-Term Evolution (LTE) radio access network (RAN), as specified by 3GPP. However, it should be understood that the techniques and apparatus are applicable to any radio access technology (RAT) or multi-RAT system, where the UE receives and/or transmit signals (e.g., data). Examples include LTE FDD/TDD, WCDMA/HSPA, GSM/GERAN, Wi Fi, WLAN, CDMA2000, etc.

The following embodiments can be applied to any of the CA scenarios illustrated in FIGS. 1-4, and beyond. In another words, the techniques described can be applied regardless of the number of CCs in DL. As long as only one UL CC is configured, then the embodiments apply directly as described. However, for the case of more than one UL CC, e.g., two UL CCs and higher, the embodiments can be applied also, unless otherwise mentioned.

Problems with Existing Solutions

In several frequency bands with a smaller duplex gap, the UL configuration (i.e., the maximum number of allowed UL RBs) is much smaller than the nominal value in the corresponding bandwidth. For example, the nominal number of RBs in a 20 MHz channel is 100 RBs. In band 20, however, the maximum number of UL RBs in 20 MHz channel bandwidth is limited to only 20. If a UE needs a higher UL data rate, then the use of 20 MHz in band 20 is not suitable.

In existing solutions, the UL configuration is not considered for selecting a cell. Instead the cell change is primarily based on DL signal quality, e.g., Reference Signal Received Power (RSRP) and/or Reference Signal Received Quality (RSRQ) measurements performed by the UE. However, the best cell in terms of signal quality on certain carrier in a band may not guarantee good performance in terms of UL data rate after cell change.

The situation in terms of UL configuration may become even worse for certain CA configurations. For example in case of certain intra-band, non-contiguous, CA configurations, depending upon the band, the maximum allowed uplink configuration may be as low as twelve UL RBs for each component carrier (CC), even for bandwidths of 15 or 20 MHz for each CC. The limited number of UL RBs means that regardless of DL data rate, the UL data rate will be severely limited. This is because in the existing solutions used for changing PCell, PCC, SCell or SCC, the network node does not take into account the maximum allowed UL configuration defined for each UL CC.

For most services there is a relation between the DL data rate and UL data rate for a given UE. For example, for typical DL best-effort services (e.g., Internet access, downloading files, etc.), the UE also has to transmit in the UL to account for feedback information, status reports, measurement reports, etc. As a result, the UL data rate can be expected to be between 10-15% of DL data rate. In existing solutions, there is no guarantee that high data rates, even in the DL, can be achieved when certain CA configurations are used.

There are also several evolving services like file upload, video streaming, gaming, etc. that require very high data rate. However, with current solutions there are no guarantees that the UL data rates required by such services can be achieved.

The limit on the UL allocation (e.g., maximum number of allowed RBs), which is specified in the standard for various UL configurations, leads to a significant reduction in UL data rate. Especially for certain carrier aggregation configurations, such a severe bottleneck in terms of reduced uplink transmission rate causes substantial performance degradation.

Described herein are methods and apparatus that can be employed to fully or partly overcome such limitations. More particularly, to circumvent the above drawbacks, methods for performing a cell change are disclosed, wherein the methods take into account the allowed UL configuration in the target cell before selecting a given target cell. The methods are applicable for wireless devices operating in single-carrier mode or in CA (in DL and/or in UL). In some embodiments, the cell change decisions are also based on additional criteria related to user traffic, interference situation, cell coverage, UE location, etc.

Embodiments of the disclosed techniques include:
  methods in a node of triggering cell change based on UL transmission;
  methods in a node of performing cell change based on UL configuration;
  methods in a first node of configuring UE for cell change based on UL configuration; and
  network nodes and wireless devices configured to carry out one or more of the above methods.

Method in a Node of Triggering Cell Change Based on UL Transmission Configuration In methods according to this group of embodiments, either a first node (e.g., a network node) serving or managing a cell change for a second node (e.g., a UE) or the second node itself performs the following steps:
  determining or obtaining one or more current or expected UL transmission parameters;
  determining or obtaining a required UL configuration; and
  comparing between required and current UL configurations of UE.

Triggering of a cell change is then based on the comparing.

In a first step, the node (i.e., first or the second node) determines one or more current or expected UL transmission parameters for the UE. The uplink transmission parameters can be determined based on one or more of the following:
  a UL transmission rate based on a measurement, e.g., average UL bit rate obtained or logged over the last certain time period;
  a UL transmission rate based on statistics or historical data related to previous UL transmissions;
  an explicit indication received by the first node from the UE, e.g., a UE report on status of its buffer size, expected data rate, etc.;
  an implicit determination based on DL data rate. DL transmission also requires certain amount of UL transmission depending upon service. For example, the first node (e.g., network node) or the second node (i.e., UE itself) may determine that the expected UL data rate is 10-15% of DL data rate if it is best effort. But DL data rate is voice over IP then the DL data rate is the same as UL data rate.

In a next step, the first or second node translates or maps the determined current or expected UL transmission parameters into the required UL configuration (Pr). More specifically, the node may map a determined data rate into the required number of physical resources. Examples of physical resources are resource blocks (RBs), resource elements, virtual RBs, physical RBs, etc. The mapping can be based on pre-defined tables which also take into account the modulation and coding scheme (MCS), etc. For example, the node may determine that for achieving up to 1 Mbps in UL it has to allocate up to at least 25 RBs to the UE in UL.

The first node may also signal the determined value of Pr to the second node, especially when the second node itself performs cell change, e.g., cell reselection in idle state. The first and the second node may use this for additional steps as described below.

Next, the node (first or second node) may compare the required UL configuration (Pr) with the current UL configuration (Pc) of the UE. The Pc here means the maximum number of UL physical resources that can be allocated for the operating carrier(s) of the UE. For example, if the UE is operating on band 20 with 20 MHz channel BW, then the maximum RBs are limited to 20 RBs, i.e., Pc=20 RBs. The node can determine the Pc based on the pre-defined information. The node may compare the Pr with Pc for each carrier frequency of the UE in case the UE is operating in CA, i.e., if the UE is configured with PCC and at least one SCC. In this case the node may compare the Pr with Pc for at least the PCC.

Examples of generalized comparison functions that can be used by the node are as follows:

$$Y1 = f(Pr, Pc) \quad (1)$$

$$Y2 = f(Pr, Pc, h) \quad (2)$$

In these expressions, Y1 and Y2 are binary (0 or 1) outputs of the function, where 0 and 1 indicate "no cell change needed" and "cell change needed," respectively. Pr and Pc are described above, while h is a resource offset parameter, which may be pre-defined, may depend on Pr or Pc, or may be configured by the first node.

The node can use one of the above functions or a variant thereof to decide whether there is a need to perform cell change due to lack of UL physical resources within the current UL configuration of the UE. This can be explained with specific examples:

For example using (1) if Pr>Pc then the node decides to perform cell change of the UE.
In another example using (2) if Pr>(Pc+h) then the node decides to perform cell change of the UE, where h is a resource offset parameter, which may be pre-defined or configured by first node or depends upon Pr or Pc.

Method in a Node of Performing Cell Change Based on UL Configuration

According to several embodiments, the node (first node or second node) may decide to perform a cell change of the UE based on the outcome of the comparison operation discussed above. The cell change herein may be performed for any of the following scenarios, for example:
1. from the current serving cell (e.g., cell1) to a second cell (e.g., cell2) where cell1 and cell2 may operate on the same carrier (e.g., f1);
2. from the current serving cell on a first carrier (e.g., f1) to a second cell on a second carrier (e.g., f2), where f1 and f2 may belong to the same frequency band or to different frequency bands;
3. from the current primary cell (PCell) on a first carrier (e.g., f1) to a second cell on a first carrier or a second carrier (e.g., f2) in CA, and where f1 and f2 may belong to the same frequency band or to different frequency bands;
4. from the current secondary cell on a third carrier (e.g., f3) to a fourth cell on a third carrier or a fourth carrier (e.g., f4) in CA, and where f3 and f4 may belong to the same frequency band or to different frequency bands;
5. a cell change scenario comprising of both 3) and 4), in CA.

In some embodiments, the following steps are performed in the node (i.e., first or second node) for performing or executing the cell change of the UE (i.e., second node):
obtaining UL configuration of a target cell; and
performing cell change to target based on at least UL configuration.

In some embodiments, the performing of the cell change may take into account one or more additional parameters:
A-MPR;
additional spurious emission requirement;
frequency location;
user location;
coverage;
uplink control information (UCI) or downlink control information (DCI) for the UE;
DL signal quality.
These operations are elaborated below.

In some embodiments, the node performing cell change (first node or second node) determines the most suitable target cell for changing at least the current serving cell (e.g., serving cell, PCell, SCell etc) of the UE, based on at least the UL configuration (Pt) of the target cell. For example, the node may determine the UL configurations for one or more target cells based on pre-defined information related to the UL configuration. The pre-defined information is defined for different bands, bandwidths within a band and also for cells that can be used for CA. Examples of pre-defined information are the minimum requirements defined in the standard as shown in tables 2-4.

As another example, the node may determine one or more target cells autonomously. For instance it can determine a target cell based on historic information or statistics, i.e., by retrieving information related to the UL configuration that has been used in the past when certain cell was used by the UE.

In another example implementation, the node (e.g., first node) may determine the UL configuration for one or more target cells based on an indication or message received from the second node, i.e., from the UE. For example, the second node may indicate that for a certain band and a bandwidth within that band it is capable of transmitting up to N number of UL RBs, e.g., N=30 RBs for bandwidth=10 MHz on frequency band 20.

In yet another exemplary implementation, the node may determine the UL configurations for one or more target cells by using any combination of the pre-defined, autonomous and UE indicated information about the supported UL configuration.

The node uses at least UL configuration for determining whether to perform a cell change, but it may also use additional criteria for selecting the most suitable target cell(s) for performing cell change of the second node as described below. For instance, the cell change may be based, at least in part, on allowed UL physical resources. The node, after acquiring one or more candidate target cells and the information about their respective UL configurations, performs the next step of selecting one or more target cells. The node may take into account the UE capability in terms of its supported bands, CA types, CA configurations (e.g., number of CCs in DL and/or UL, etc.) for selecting the one or more target cells for the cell change. The UE capabilities are obtained based on explicit indication from the second node and/or historical data, statistics or past history.

The selection of the most suitable target cell out of the candidate cells by the node can be based on a pre-defined rule, autonomous selection, or a recommendation received from the second node. In all of these cases, the selection is based on at least one criterion related to UL configuration of the target cell(s).

Examples of one or more such criteria or functions are explained below:
1. In one example, the node may select the target cell that leads to largest or maximum number of UL physical channels.
2. In another example, the node may select the target cell that satisfies the condition that relates Pt and Pr, such as Pt Pr, where Pt and Pr are the UL configuration of target cell (e.g., 25 RBs) to be chosen and the required UL configuration (e.g., 25 RBs) respectively.
3. In yet another example, the node may select the target cell that satisfies the condition that relates Pt, Pr, and threshold g, such as Pt≥(Pr+g), where Pt is the UL configuration of target cell to be chosen (e.g., 25 RBs), Pr is a required UL configuration (e.g., 20 RBs), and g is a margin (e.g., 3 RBs).

4. In another exemplary implementation, the node may determine or select one or more target cells based on a recommendation or message received from the second node. For example, the second node may recommend the use of a certain target cell on a certain carrier or band with UL configuration above a threshold, e.g., 30 RBs. The node (e.g., first node) may take into account the recommendation from the second node when selecting the target cell for doing cell change. The node may also request the second node to send the recommended target cells that can meet certain UL configuration, e.g., those that satisfy any one or more conditions in criteria 1-3 above. The node may also consider other criteria and/or pre-defined rules (e.g., criteria 1-3 above) when selecting the final target cell(s) for the cell change.

It is further elaborated here how the wireless device (i.e., second node) can be configured to transmit UL in the UL cell of a frequency based on available maximum allowed UL resources. As an example, if we denote the maximum number of UL physical channels and total number of UL physical channels in first and second cells based on first and second frequency as $Ch_{max1}$ $Ch_{tot1}$, $Ch_{max2}$ and $Ch_{tot2}$, respectively, then we can define the ratios of maximum allowed channels as:

$$Ch_{ratio1}=(Ch_{max1}/Ch_{tot1}), \text{ and}$$

$$Ch_{ratio2}=(Ch_{max2}/Ch_{tot2}) \text{ respectively.}$$

In this case, the UL transmission can be configured for the UL cell with the first frequency if $Ch_{ratio1}>Ch_{ratio2}$, and vice versa. In another embodiment, UL transmission can be configured on UL cell with the first frequency if $Ch_{max1}>Ch_{max2}$, and vice versa.

The above can be applied for a serving cell or PCell in single carrier operation of the wireless device and can also be applied for both PCell and SCell in any CA combination. The cell change based on criterion related to the UL configuration (i.e., UL physical resources) will ensure that after the cell change the wireless device is able to enhance its UL data rate or throughput. This will also allow the wireless device to enhance its DL data rate or throughput since higher data rate in DL also proportionally requires higher UL data rate.

Cell Change Based on A-MPR or Additional Spectrum Emission Mask

In some embodiments, the UL cell allocation/selection can further be done based on the Additional-Maximum Power Reduction (A-MPR) requirements. A-MPR requirements are defined due to additional spurious emission requirements in any band. Therefore, information about the A-MPR requirement can be obtained based on pre-defined requirements specified in the standard and/or historical data or statistics about A-MPR usage.

As an example, A-MPR requirements for the first and second carriers are denoted as $AMPR_{f1}$ and $AMPR_{f2}$. When MPR for is stricter for f1, compared to that of f2, then the UL cell of second frequency is allocated to or selected for the terminal.

MPR and A-MPR formulas are defined as a function of UL allocations, N, thus, if $AMPR_{f1}(N)>AMPR_{f2}(N)$, then the UL cell will be allocated to f2.

Since stricter MPR means that the UL coverage is also reduced, using UL cell of second frequency will increase the coverage of UL cell for this terminal.

Similarly, Additional Spectrum Emission Mask (ASEM) of two bands at band f1 and f2 respectively, if $ASEM_{f1}>ASEM_{f2}$, then the UL cell will be allocated to f2.

The above can be applied for a serving cell or PCell in single carrier operation of the wireless device and can also be applied for both PCell and SCell in any CA combination. The cell change based on criterion related to the A-MPR or additional spectrum emission mask will ensure that after the cell change the wireless device is able to enhance its UL coverage.

Cell Change Based on Additional Spurious Emission Requirement

Complementary to the above approach, a cell with less strict additional spurious emission requirements can be chosen for UL. The information about additional spurious emission requirement can be obtained based on pre-defined requirements specified in the standard and/or historical data or statistics of experienced additional spurious emission.

The additional spurious emission requirements are defined for protecting other UEs from interference, i.e., for UE-to-UE coexistence. The band that has lower additional spurious emission requirement can be chosen in this case.

Performing a cell change based on criterion related to the additional spurious emission requirement will ensure that after the cell change the wireless device is able to enhance its UL coverage.

Cell Change Based on Frequency Location

Depending on the physical allocation of UL signals or the UL physical allocation in frequency with respect to DL frequency, there are harmonics and inter-modulation issues between UL transmission and DL reception. The same is also valid for UL reception and DL transmission. Information about the impact of frequency location of channel on harmonics and inter-modulation can be obtained based on pre-defined requirements specified in the standard and/or historical data or statistics of frequency location dependent harmonics and inter-modulation observed or experienced in the past.

In embodiments according to this approach, cell change is performed by the node based on harmonics and/or inter-modulation impacts. Performing a cell change based on criterion related to the frequency location of channel will ensure that after the cell change the wireless device is able to enhance its UL and DL signal reception qualities.

PCell Allocations Based on User Location

In some embodiments, when more than two CCs are used in DL, e.g., 3DL CA where inter-band and intra-band combinations are used, then the intra-band combinations are used by the node only when the user is located close to cell center. This is due to the fact that, with such a user location, UL PCC transmission power will be less, thus reducing the interference at the DL SCC in intra-band non-contiguous case. Users who are further from the cell center could be allocated on the inter-band component of this combination.

In the event that both intra-band and inter-band component carriers are used in 3DL combination, then in some embodiments the UL is always allocated to the inter-band CC. In the example of B2+B2+B13 3DL inter- and intra-band CA, as shown in FIG. 8, the users located close to the base station can be allocated B2 UL, while further users will use B13 UL. In this way, challenging UL configurations can be avoided by the node when possible. The node takes into account the wireless device CA related capabilities when selecting or changing to the most suitable CA configuration based on wireless device location with respective to serving node.

The node may determine the location of the wireless device with respect to the serving cell or another cell, such as a neighboring cell, based on one or more radio measurements performed by the wireless device and/or node itself, e.g., RSRP, RSRQ, UE Rx-Tx time difference measurement, eNB Rx-Tx time difference measurements, etc.

The location of the wireless device can also be determined more precisely based on existing one or more suitable positioning methods. Examples of positioning methods are A-GNSS, OTDOA, enhanced cell ID, etc. For example the location of the wireless device can be determined based on location information (e.g., geographical coordinates) received from the wireless device itself and/or from another node such as positioning node (e.g., E-SMLC in LTE).

Performing a cell change based on criterion related to the user location will ensure that after the cell change the wireless device is able to enhance its UL and DL signal reception performance (e.g., data rate, signal quality, etc.) while still operating in CA.

UL PCell Change Based on Coverage

In some embodiments, the UL is allocated by the node based on the link quality seen at the available UL frequencies. As an example, when the terminal is located far from the transmission node, then signals at certain frequencies are stronger than the other carrier. This is clearly seen from left hand side of FIG. 5, where users further from cell center may see stronger signals on the f1 carrier compared to the f2 carrier. For the RRH case on the right hand side of FIG. 5, when a user is close to RRH, the UL cell of the frequency available at the RRH can be stronger than the macro UL frequency. In this case, the UL cell of RRH carrier should be allocated to the terminal.

The location of the wireless device can be determined by using one or more of the principles described in the immediately preceding section.

FIG. 9 shows an example of a 2DL CA case, where the UL can be allocated to a UE that sees better path-loss conditions in a certain band. If we denote propagation loss of two bands as $PL_{f1}$ and $PL_{f2}$, then if: $PL_{f1} < PL_{f2}$, then the UL cell is connected to f1.

In other embodiments, the cell change is done based on both UL coverage and the UL configuration. For example, if we denote $10*\log 10(Ch_{ratio1}) = \alpha$ and $10*\log 10(Ch_{ratio2}) = \beta$, then if $(\alpha-\beta)+(PL_{f1}-PL_{f2}) < (\beta-\alpha)+(PL_{f2}-PL_{f1})$, then UL Pcell is always allocated to f2. Similarly, if $(\alpha-\beta)+(PL_{f1}-PL_{f2}) > (\beta-\alpha)+(PL_{f2}-PL_{f1})$, then UL Pcell is always allocated to f1.

Similar conditions can be derived for higher number cells in the CA combination. The cell change based on criterion related to the UL coverage will ensure that after the cell change the wireless device is able to enhance its UL coverage and can be served by the serving cell over longer time.

Cell Change Based on DL Signal Measurement

According to this criterion, the node uses one or more DL signal measurements (e.g., signal strength, signal quality, etc.) measurements performed by the wireless device for selecting the most suitable cell(s). Examples of DL signal measurements are path loss, RSRP, RSRQ, SNR, SINR, etc. For example the node may select the target cell out of the candidate target cells which has best signal quality, e.g., largest RSRQ value.

The cell change based on criterion related to the DL signal measurement will ensure that after the cell change the wireless device is able to enhance the reception quality of its DL received signals, e.g., enhance Physical Downlink shared Channel (PDSCH), Physical Downlink Control Channel (PDCCH), Physical Hybrid Indicator Channel (PHICH) reception performance, etc.

Combination of Criteria for Cell Chance

The node performing cell change of the wireless device may use at least the criterion based on UL configuration (e.g., UL RBs), as described above, and any combination of one or more of the additional criteria described above. For example, if two target cells meet the criterion that UL configuration is within acceptable limit, then the node may decide the target cell based on for example the DL signal quality, i.e., selecting the cell whose DL quality is the best.

The selection based on additional criteria may also depend upon whether the UE is in CA and may further depend upon the type of CA (e.g., intra-band contiguous, inter-band CA, etc.) is used and/or CA configuration (e.g., number of DL and/or UL component carriers). For example if cell change is done when CA is used (e.g., PCell and/or SCell change) then the node may use the additional criterion based on UE location with respect to serving network node.

Method in a First Node of Configuring UE for Cell Change Based on UL Configuration The wireless device (i.e., the second node) may also autonomously perform cell change (e.g., cell reselection in idle state) based on at least the UL configuration of a cell using the procedures disclosed above. According to another aspect of the presently disclosed techniques, the first node may decide to activate or deactivate a UE-based cell change that uses UL configuration of the currently serving and new (target) cells. For example it may be pre-defined that by default the UE performs cell change based on DL signal measurement. However, the UE can be configured anytime by the first node (e.g., serving network node) to use the UL configuration as the main or primary criterion for cell change. Similarly, a UE-based cell change that uses UL configuration as the main criterion may also be deactivated by the first node. This can be achieved by the first node transmitting an indicator or configuration message to a UE or to a group of UEs via signaling such as RRC.

Example Process Flows

With the specific embodiments detailed above in mind, it should be appreciated that FIGS. 10 and 11 are process flow diagrams illustrating generalized methods, according to some embodiments of the present techniques, for performing a cell change for a wireless device from a first cell on a first frequency to a second cell on second frequency, as might be implemented in a network node other than the served wireless device and in the served wireless device, respectively.

As seen at block 1010, the method illustrated in FIG. 10 includes obtaining the uplink transmission configuration related to at least uplink physical channels that can be transmitted by the wireless device on the second cell on the second frequency. As shown at block 1020, the method further includes comparing at least one parameter of the determined uplink transmission configuration with a threshold or with a corresponding parameter of a determined uplink transmission configuration related to uplink physical channels that can be transmitted by the wireless device on the first cell on the first frequency. Finally, as shown at block 1030, a cell change to the second cell is performed, based on at least the comparison.

In some embodiments, the uplink transmission configuration for a given cell includes, or determines, at least one of: a number of UL physical channels that can be transmitted, such as a maximum uplink transmission block size for the wireless device for the cell or a maximum number of uplink resource blocks for the cell; a relation between number of UL physical channels that can be transmitted (Ch_max) and total number of UL physical channel (Ch_tot) over the transmission bandwidth (e.g., ratio=UL Ch_max/Ch_tot); a location of the UL physical channels in uplink frequency and/or location of the UL physical channels with respect to the DL physical channel in frequency domain; UE additional maximum power reduction (A-MPR) requirement; UE additional spectrum emission mask or additional spurious emission requirements; and inband blocking.

In some embodiments, the cell change to the second cell is performed responsive to the comparison meeting at least one of the following conditions: a number of UL physical channels that can be transmitted is above a threshold; a ratio of UL Ch_max to Ch_tot is above a threshold; a magnitude of difference between the locations of at least one UL physical channel that can be transmitted and last or first UL physical channel in frequency domain is above a threshold; MPR is below a threshold; and UE additional spurious emission requirement level below a threshold is A-MPR is below a threshold.

In some embodiments, the step of comparing comprises comparing at least one parameter related to the determined uplink transmission configuration on the second cell on the second frequency with the corresponding parameter related to the determined uplink transmission configuration on the first cell on the first carrier. In some of these embodiments, the cell change to the second cell is performed responsive to determining that the magnitude of the difference between the at least one parameter related to the determined uplink transmission configuration on the second cell on the second frequency with the corresponding parameter related to the determined uplink transmission configuration on the first cell on the first carrier is within a certain threshold. In some of these embodiments, the cell change to the second cell is performed responsive to at least one of the following conditions being met: a magnitude of difference between number of UL physical channels on first and second cells that can be transmitted is within a threshold; a magnitude of difference between ratios of UL Ch_max to Ch_tot on first and second cells is within a threshold; a magnitude of difference between: the magnitude of difference between the locations of at least one UL physical channel that can be transmitted and last or first UL physical channel in frequency domain for the first cell, and the magnitude of difference between the locations of at least one UL physical channel that can be transmitted and last or first UL physical channel in frequency domain for the second cell, is within a threshold; a magnitude of difference between MPRs on the first and second cells is below a threshold; a magnitude of difference between UE additional spurious emission requirement levels or A-MPRs for the first and the second cells is within a threshold.

In some embodiments, the uplink physical channel is an uplink resource block, uplink physical resource block or uplink virtual resource block. In some embodiments, the uplink transmission configuration enables the wireless device to meet pre-defined downlink receiver sensitivity requirements. In some embodiments, the first cell is the SCell and the first frequency is a primary frequency or a secondary frequency. In other embodiments, the second cell and the second frequency are any of: SCell and secondary frequency respectively; Inter-frequency cell and inter-frequency carrier respectively; or Inter-RAT cell and inter-RAT carrier respectively. In some embodiments, the uplink transmission configuration is pre-defined [e.g., in standard] or received from another node.

FIG. 11 illustrates a related method as might be implemented by a wireless device. As seen at block 1110, the method illustrated in FIG. 11 includes obtaining or otherwise determining the uplink transmission configuration related to physical channels that can be transmitted by the wireless device on the second frequency. The uplink transmission configuration may be obtained from the network, for example. As shown at block 1120, the method further includes comparing at least one parameter related to the determined uplink transmission configuration with a threshold, or with a corresponding parameter of a determined uplink transmission configuration related to uplink physical channels that can be transmitted by the wireless device on the first cell on the first frequency. Finally, as shown at block 1130, the wireless device performs a cell change to the second cell is performed, based on at least the comparison.

In some embodiments, the threshold is pre-defined or received from the network node. In some embodiments, the cell change is at least one of: cell reselection, RRC connection re-establishment and RRC connection release with re-direction. It should be appreciated that several of the variations discussed above for the method illustrated in FIG. 10 are equally applicable to the method shown in FIG. 11.

Example Hardware Implementations

Several of the techniques and methods described above may be implemented using electronic data processing circuitry and radio circuitry or other interface circuitry provided in a network node, such as in an eNB or other base station or a Radio Network Controller (RNC), or the like. FIG. 12 illustrates an example configuration of a base station 401A that, in some embodiments, may perform some of the example methods described herein, including the method illustrated in FIG. 10.

Base station 401A, which may be an eNB for use in an LTE Radio Access Network (RAN), for example, includes a communication interface circuit configured to communicate with a core network (CN) node and configured to communicate with one or more wireless devices. In this case, the communication interface circuit includes two parts—radio circuitry 410A, which is configured to receive and/or transmit communication measurements, data, instructions, and/or messages to and from one or more wireless devices, and a network interface circuit 440A that is configured to receive and send network communications to and from other network nodes, including one or more CN nodes. It should be appreciated that the radio circuitry 410A may be comprised as any number of transceiving, receiving, and/or transmitting units or circuitry. The radio circuitry 410A and/or network interface 440A may comprise radio-frequency (RF) circuitry and baseband processing circuitry, the details of which are well known to those familiar with base station design.

The base station 401A also comprises a processing circuitry 420A, which is configured to, for example, perform a cell change of a wireless device from a first cell on a first frequency to a second cell on second frequency by obtaining the uplink transmission configuration related to at least uplink physical channels that can be transmitted by the wireless device on the second cell on the second frequency, comparing at least one parameter related to the determined uplink transmission configuration with a threshold, and performing a cell change to the second cell based on at least the comparison.

The processing circuitry 420A may be any suitable type of computation unit, e.g. a microprocessor, digital signal processor (DSP), field programmable gate array (FPGA), or application specific integrated circuit (ASIC), or any other form of circuitry. The base station 401A may further comprise a memory unit or circuitry 430A which may be any suitable type of computer readable memory and may be of volatile and/or non-volatile type. The memory 430A may be configured to store program data, for use by processing circuitry 420A, as well as configuration data, operational data, etc.

It will be appreciated that the processing circuit 420A, as adapted with program code stored in program and data memory 430A, can implement the process flow of FIG. 10 (or a variant thereof) using an arrangement of functional "modules," where the modules are computer programs or portions of computer programs executing on the processor circuit 420A. Thus, the apparatus 401A can be understood as comprising a communications interface 410A/440A configured to communicate with a CN node and configured to communicate with one or more wireless devices, and further comprising several functional modules implemented in processing circuitry 420A. This representation of the apparatus 401A is shown in FIG. 13. The functional modules implemented by the processing circuitry 420A and memory 430A in FIG. 13 include: an obtaining module 1310 for determining the uplink transmission configuration related to at least uplink physical channels that can be transmitted by the wireless device on the second cell on the second frequency, a comparing module 1320 for comparing at least one parameter related to the determined uplink transmission configuration with a threshold, or with a corresponding parameter of a determined uplink transmission configuration related to uplink physical channels that can be transmitted by the wireless device on the first cell on the first frequency, and a handover module 1330 for performing a cell change to the second cell based on at least the comparison.

While the base station, e.g., an LTE eNB, shown in FIG. 13 is one example of a RAN node in which some of the inventive techniques described herein may be applied, these techniques may be applied in other RAN nodes, in some embodiments. FIG. 14 illustrates an example configuration of another RAN node 505A that, in some embodiments, may perform some of the example methods described herein, including the method illustrated in FIG. 10. RAN node 505A may be an RNC in some embodiments, for example.

RAN node 505A includes a communication interface circuit 510A configured to communicate with a CN node and to control one or more wireless devices, via signaling transmitted to one or more other nodes in the RAN (e.g., one or more base stations). Communication interface 505A typically comprises baseband processing circuitry and driver circuitry, the details of which are well known to those familiar with network component design.

RAN node 505A also comprises processing circuitry 520A, which is configured to, for example, perform a cell change of a wireless device from a first cell on a first frequency to a second cell on second frequency by obtaining the uplink transmission configuration related to at least uplink physical channels that can be transmitted by the wireless device on the second cell on the second frequency, comparing at least one parameter related to the determined uplink transmission configuration with a threshold or with a corresponding parameter of a determined uplink transmission configuration related to uplink physical channels that can be transmitted by the wireless device on the first cell on the first frequency, and performing a cell change to the second cell based on at least the comparison.

The processing circuitry 520A may be any suitable type of computation unit, e.g. a microprocessor, digital signal processor (DSP), field programmable gate array (FPGA), or application specific integrated circuit (ASIC), or any other form of circuitry. RAN node 505A may further comprise a memory unit or circuitry 530A which may be any suitable type of computer readable memory and may be of volatile and/or non-volatile type. The memory 530A may be configured to store program data as well as configuration data, operational data, etc.

It will be appreciated that the processing circuit 520A, as adapted with program code stored in program and data memory 530A, can implement the process flow of FIG. 10 (or a variant thereof) using an arrangement of functional "modules," where the modules are computer programs or portions of computer programs executing on the processor circuit 520A. Thus, the apparatus 505A can be understood as comprising a communications interface 510A configured to communicate with a CN node and configured to communicate with one or more wireless devices, via signaling transmitted to one or more other nodes in the RAN, and further comprising several functional modules implemented in processing circuitry 520A. These functional modules, which are essentially the same as those illustrated in the base station apparatus of FIG. 13, include: an obtaining module for determining the uplink transmission configuration related to at least uplink physical channels that can be transmitted by the wireless device on the second cell on the second frequency, a comparing module for comparing at least one parameter related to the determined uplink transmission configuration with a threshold or with a corresponding parameter of a determined uplink transmission configuration related to uplink physical channels that can be transmitted by the wireless device on the first cell on the first frequency, and a handover module for performing a cell change to the second cell based on at least the comparison.

Several of the techniques and methods described above may be implemented using radio circuitry and electronic data processing circuitry provided in a wireless device. FIG. 15 illustrates features of an example terminal device 400 according to several embodiments. Wireless device 400, which may be a UE configured for operation with an LTE network (E-UTRAN) and that also supports Wi-Fi, for example, comprises a transceiver unit 420 for communicating with one or more base stations (eNBs) as well as a processing circuit 410 for processing the signals transmitted and received by the transceiver unit 420. Transceiver unit 420 includes a transmitter 425 coupled to one or more transmit antennas 428 and receiver 430 coupled to one or more receiver antennas 433. The same antenna(s) 428 and 433 may be used for both transmission and reception. Receiver 430 and transmitter 425 use known radio processing and signal processing components and techniques, typically according to a particular telecommunications standard such as the 3GPP standards for LTE. Note also that transmitter unit 420 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the techniques described herein, additional details are not shown here.

Processing circuit 410 comprises one or more processors 440 coupled to one or more memory devices 450 that make up a data storage memory 455 and a program storage memory 460. Processor 440, identified as CPU 440 in FIG. 3, may be a microprocessor, microcontroller, or digital signal processor, in some embodiments. More generally, processing circuit 410 may comprise a processor/firmware combination, or specialized digital hardware, or a combination thereof. Memory 450 may comprise one or several types of memory such as read-only memory (ROM), random-access memory, cache memory, flash memory devices, optical storage devices, etc. Because terminal device 400 supports multiple radio access technologies, processing circuit 410 may include separate processing resources dedicated to one or several radio access technologies, in some embodiments. Again, because the various details and engineering tradeoffs associated with the design of baseband processing circuitry for mobile devices are well known and are unnecessary to a full understanding of the techniques described herein, additional details are not shown here.

Typical functions of the processing circuit 410 include modulation and coding of transmitted signals and the demodulation and decoding of received signals. In several embodiments, processing circuit 410 is adapted, using suitable program code stored in program storage memory 460, for example, to carry out any of the embodiments described above, including the method illustrated in FIG. 11, for example. Thus, for example, the processing circuit 410 may be adapted to determine an uplink transmission configuration related to uplink physical channels that can be transmitted by the wireless device on the second cell on the second frequency, compare a parameter of the determined uplink transmission configuration with a threshold or with a corresponding parameter of a determined uplink transmission configuration related to uplink physical channels that can be transmitted by the wireless device on the first cell on the first frequency; and perform 1130 a cell change to the second cell, based on the comparison. Of course, it will be appreciated that not all of the steps of these embodiments are necessarily performed in a single microprocessor or even in a single module.

FIG. 16 illustrates another representation of wireless device 400, this time with the various processing operations described above shown as functional modules. These functional modules include an obtaining module 1610 for determining the uplink transmission configuration related to at least uplink physical channels that can be transmitted by the wireless device on the second cell on the second frequency, a comparing module 1620 for comparing at least one parameter related to the determined uplink transmission configuration with a threshold or with a corresponding parameter of a determined uplink transmission configuration related to uplink physical channels that can be transmitted by the wireless device on the first cell on the first frequency, and a handover module 1630 for performing a cell change to the second cell based on at least the comparison Embodiments of the presently disclosed techniques include the several methods described above, including the methods illustrated in the process flow diagrams of FIGS. 10 and 11, as well as variants thereof. Other embodiments include network node apparatus configured to carry out one or more of these methods. In some embodiments of the invention, processing circuits, such as the processing circuits shown in FIGS. 12-16, are configured to carry out one or more of the techniques described in detail above. Likewise, other embodiments may include network nodes and wireless devices that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

It will be appreciated by the person of skill in the art that various modifications may be made to the above described embodiments without departing from the scope of the present invention. For example, although embodiments of the present invention have been described with examples that reference a communication system compliant to the 3GPP-specified LTE standards, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", an and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method, in a network node, of performing cell change of a wireless device from a first cell on a first frequency to a second cell on a second frequency, the method comprising:
    determining an uplink transmission configuration related to uplink physical channels that can be transmitted by the wireless device on the second cell on the second frequency;
    comparing a parameter of the determined uplink transmission configuration with a threshold or with a corresponding parameter of a determined uplink transmission configuration related to uplink physical channels that can be transmitted by the wireless device on the first cell on the first frequency; and
    performing a cell change to the second cell based on the comparison.

2. The method of claim 1, wherein the uplink transmission configurations for the first and second cells include maximum uplink transmission block sizes for the wireless device on the first and second cells, respectively, and/or maximum numbers of uplink resource blocks for the wireless device on the first and second cells, respectively.

3. The method of claim 1, wherein the cell change to the second cell is performed in response to said comparison meeting at least one of the following conditions:
    a number of uplink physical channels that can be transmitted by the wireless device on the second cell is above the threshold;
    a ratio of a number of uplink physical channels that can be transmitted by the wireless device on the second cell and a total number of uplink physical channels over the transmission bandwidth of the second cell is above the threshold;
    a difference, in the frequency domain, between the locations of at least one uplink physical channel that can be transmitted by the wireless device in the second cell and a last or first uplink physical channel in the second cell is above the threshold;
    a maximum power reduction for the wireless device in the second cell is below the threshold; and
    a spurious emission requirement level for the wireless device in the second cell is below the threshold; and
    an Additional Maximum Power Reduction for the wireless device in the second cell is below the threshold.

4. The method of claim 1, wherein said comparing comprises comparing a parameter related to the determined uplink transmission configuration on the second cell on the second frequency with a corresponding parameter related to a determined uplink transmission configuration on the first cell.

5. The method of claim 4, wherein the cell change to the second cell is performed in response to the difference between the parameter related to the determined uplink transmission configuration on the second cell with the corresponding parameter related to the determined uplink transmission configuration on the first cell being below the threshold.

6. The method of claim 5, wherein the cell change to the second cell is performed in response to at least one of the following conditions being met:
   a difference between the numbers of uplink physical channels that can be transmitted by the wireless device on the first and second cells is below a threshold;
   a difference between the ratio of the number of uplink physical channels that can be transmitted by the wireless device on the second cell to the total number of uplink physical channels over the transmission bandwidth of the second cell and the ratio of the number of uplink physical channels that can be transmitted by the wireless device on the first cell to the total number of uplink physical channels over the transmission bandwidth of the first cell is above threshold;
   a difference between: the difference in frequency between the locations of at least one uplink physical channel that can be transmitted and a last or first uplink physical channel for the first cell, and the difference in frequency between the locations of at least one uplink physical channel that can be transmitted and a last or first uplink physical channel for the second cell, is above a threshold;
   a difference between maximum power reductions on the first and second cells is below a threshold; and
   a difference between additional spurious emission requirement levels or additional maximum power reductions for the wireless device on the first and the second cells is above a threshold.

7. The method of claim 1, wherein the uplink physical channels are uplink resource blocks, uplink physical resource blocks, or uplink virtual resource blocks.

8. The method of claim 1, wherein the cell change to the second cell is performed further in response to determining that the uplink transmission configuration for the second cell enables the wireless device to meet pre-defined downlink receiver sensitivity requirements.

9. The method of claim 1, wherein the first cell is a primary cell and the second cell is a secondary cell in an uplink carrier aggregation for the wireless device.

10. The method of claim 1, wherein the second cell and the second frequency are any of:
    a secondary cell in an uplink carrier aggregation for the wireless device and a secondary frequency, respectively;
    an inter-frequency cell and an inter-frequency carrier, respectively; or
    an inter-radio-access-technology cell and an inter-radio-access-technology carrier, respectively.

11. The method of claim 1, wherein the uplink transmission configuration for the second cell is pre-defined or received from another node.

12. The method of claim 1, wherein said determining the uplink transmission configuration, comparing the parameter, and performing the cell change are triggered by:
    determining a current or expected uplink transmission parameter for the wireless device;
    determining a required uplink configuration, based on the current or expected uplink transmission parameter; and
    comparing the required uplink configuration to a current uplink configuration for the first cell.

13. The method of claim 12, wherein the current or expected uplink transmission parameter for the wireless device is one of:
    an uplink transmission rate based on a measured average uplink rate over a time period;
    an uplink transmission rate based on previous uplink transmissions;
    a buffer size or expected data rate reported to the network node by the wireless device; and
    an uplink transmission rate estimated from a downlink data rate.

14. A method, in a wireless device connected to or served by a network node, of performing cell change from a first cell on a first frequency to a second cell on a second frequency, the method comprising:
    determining an uplink transmission configuration related to uplink physical channels that can be transmitted by the wireless device on the second cell on the second frequency;
    comparing a parameter of the determined uplink transmission configuration with a threshold or with a corresponding parameter of a determined uplink transmission configuration related to uplink physical channels that can be transmitted by the wireless device on the first cell on the first frequency; and
    performing a cell change to the second cell based on the comparison.

15. The method of claim 14, wherein the parameter comprises at least one of:
    maximum uplink transmission block sizes for the wireless device on the first and second cells, respectively,
    a maximum number of uplink resource blocks for the wireless device on the first and second cells, respectively
    a number of uplink physical channels that can be transmitted on the first and second cells, respectively;
    a relation between a number of uplink physical channels that can be transmitted by the wireless device on the first and second cells, respectively and a total number of uplink physical channels over the transmission bandwidth of on the first and second cells, respectively;
    a location of the uplink physical channels in frequency and/or location of the uplink physical channels with respect to downlink physical channels of the first and second cells, respectively;
    an additional maximum power reduction requirement for the wireless device in the first and second cells, respectively;
    spectrum emission masks or spurious emission requirements for the wireless device in the first and second cells, respectively; and
    an inband blocking for the first and second cells, respectively.

16. The method of claim 14, wherein the threshold is pre-defined or received from the network node.

17. The method of claim 14, wherein the cell change to the second cell is further based on a downlink signal measurement.

18. The method of claim 14, wherein performing the cell change comprises at least one of: cell reselection, handover, Radio Resource Control connection re-establishment, Radio Resource Control connection release with re-direction, primary cell change in carrier aggregation (CA), primary component carrier (PCC), change in CA, secondary cell change in CA, secondary component carrier (SCC), change in CA and swapping between PCC and SCC.

19. A network node adapted to perform a cell change of a wireless device from a first cell on a first frequency to a second cell on a second frequency, the network node comprising a processing circuit configured to:

determine an uplink transmission configuration related to uplink physical channels that can be transmitted by the wireless device on the second cell on the second frequency;

compare a parameter of the determined uplink transmission configuration with a threshold or with a corresponding parameter of a determined uplink transmission configuration related to uplink physical channels that can be transmitted by the wireless device on the first cell on the first frequency; and perform a cell change to the second cell based on the comparison.

20. The network node of claim 19, wherein the uplink transmission configurations for the first and second cells include maximum uplink transmission block sizes for the wireless device on the first and second cells, respectively, and/or maximum numbers of uplink resource blocks for the wireless device on the first and second cells, respectively.

21. The network node of claim 19, wherein the processing circuit is configured to perform the cell change to the second cell in response to the comparing meeting at least one of the following conditions:

a number of uplink physical channels that can be transmitted by the wireless device on the second cell is above the threshold;

a ratio of a number of uplink physical channels that can be transmitted by the wireless device on the second cell and a total number of uplink physical channels over the transmission bandwidth of the second cell is above the threshold;

a difference, in the frequency domain, between the locations of at least one uplink physical channel that can be transmitted by the wireless device in the second cell and a last or first uplink physical channel in the second cell is above the threshold;

a maximum power reduction for the wireless device in the second cell is below the threshold; and a spurious emission requirement level for the wireless device in the second cell is below the threshold; and an Additional Maximum Power Reduction for the wireless device in the second cell is below the threshold.

22. The network node of claim 19, wherein the processing circuit is configured to perform said comparing by comparing a parameter related to the determined uplink transmission configuration on the second cell on the second frequency with a corresponding parameter related to a determined uplink transmission configuration on the first cell.

23. The network node of claim 22, wherein the processing circuit is configured to perform the cell change to the second cell in response to the difference between the parameter related to the determined uplink transmission configuration on the second cell with the corresponding parameter related to the determined uplink transmission configuration on the first cell being below the threshold.

24. The network node of claim 23, wherein the processing circuit is configured to perform the cell change to the second cell in response to at least one of the following conditions being met:

a difference between the numbers of uplink physical channels that can be transmitted by the wireless device on the first and second cells is below a threshold;

a difference between the ratio of the number of uplink physical channels that can be transmitted by the wireless device on the second cell to the total number of uplink physical channels over the transmission bandwidth of the second cell and the ratio of the number of uplink physical channels that can be transmitted by the wireless device on the first cell to the total number of uplink physical channels over the transmission bandwidth of the first cell is above threshold;

a difference between: the difference in frequency between the locations of at least one uplink physical channel that can be transmitted and a last or first uplink physical channel for the first cell, and the difference in frequency between the locations of at least one uplink physical channel that can be transmitted and a last or first uplink physical channel for the second cell, is above a threshold;

a difference between maximum power reductions on the first and second cells is below a threshold; and a difference between additional spurious emission requirement levels or additional maximum power reductions for the wireless device on the first and the second cells is above a threshold.

25. The network node of claim 19, wherein the uplink physical channels are uplink resource blocks, uplink physical resource blocks, or uplink virtual resource blocks.

26. The network node of claim 19, wherein the processing circuit is configured to perform the cell change to the second cell further in response to determining that the uplink transmission configuration for the second cell enables the wireless device to meet pre-defined downlink receiver sensitivity requirements.

27. The network node of claim 19, wherein the first cell is a primary cell and the second cell is a secondary cell in an uplink carrier aggregation for the wireless device.

28. The network node of claim 19, wherein the second cell and the second frequency are any of:

a secondary cell in an uplink carrier aggregation for the wireless device and a secondary frequency, respectively;

an inter-frequency cell and an inter-frequency carrier, respectively; or an inter-radio-access-technology cell and an inter-radio-access-technology carrier, respectively.

29. The network node of claim 19, wherein the processing circuit is configured to receive the uplink transmission configuration for the second cell from another node.

30. The network node of claim 19 wherein the processing circuit is configured to perform the determining the uplink transmission configuration, comparing the parameter, and performing the cell change in response to:

determining a current or expected uplink transmission parameter for the wireless device;

determining a required uplink configuration, based on the current or expected uplink transmission parameter; and comparing the required uplink configuration to a current uplink configuration for the first cell.

31. The network node of claim 30, wherein the current or expected uplink transmission parameter for the wireless device is one of:

an uplink transmission rate based on a measured average uplink rate over a time period;

an uplink transmission rate based on previous uplink transmissions;

a buffer size or expected data rate reported to the network node by the wireless device; and an uplink transmission rate estimated from a downlink data rate.

32. A wireless device adapted to be connected to or served by a network node and to perform a cell change from a first cell on a first frequency to a second cell on a second frequency, wherein the wireless device comprises processing circuitry configured to:
  determine an uplink transmission configuration related to uplink physical channels that can be transmitted by the wireless device on the second cell on the second frequency;
  compare a parameter of the determined uplink transmission configuration with a threshold or with a corresponding parameter of a determined uplink transmission configuration related to uplink physical channels that can be transmitted by the wireless device on the first cell on the first frequency; and
  perform a cell change to the second cell based on the comparison.

33. The wireless device of claim 32, wherein the uplink transmission configuration for the first cell or the second cell comprises at least one of:
  a maximum uplink transmission block sizes for the wireless device on the first and second cells, respectively,
  a maximum number of uplink resource blocks for the wireless device on the first and second cells, respectively
  a number of uplink physical channels that can be transmitted on the first and second cells, respectively;
  a relation between a number of uplink physical channels that can be transmitted by the wireless device on the first and second cells, respectively and a total number of uplink physical channels over the transmission bandwidth of on the first and second cells, respectively;
  a location of the uplink physical channels in frequency and/or location of the uplink physical channels with respect to downlink physical channels of the first and second cells, respectively;
  an additional maximum power reduction requirement for the wireless device in the first and second cells, respectively;
  an additional spectrum emission mask or additional spurious emission requirements for the wireless device in the first and second cells, respectively; and
  an inband blocking for the first and second cells, respectively.

34. The wireless device of claim 32, wherein the processing circuitry is configured to receive the threshold from the network node.

35. The wireless device of claim 32, wherein the processing circuitry is configured to perform the cell change to the second cell based further on a downlink signal measurement.

36. The wireless device of claim 32, wherein the cell change comprises at least one of: cell reselection, handover, Radio Resource Control connection re-establishment, Radio Resource Control connection release with re-direction, primary cell change in carrier aggregation (CA), primary component carrier (PCC), change in CA, secondary cell change in CA, secondary component carrier (SCC), change in CA and swapping between PCC and SCC.

* * * * *